US011207959B2

(12) United States Patent
Gauci

(10) Patent No.: US 11,207,959 B2
(45) Date of Patent: Dec. 28, 2021

(54) REAR MOUNTED FOLDABLE TOP

(71) Applicant: Lund Motion Products, Inc., Buford, GA (US)

(72) Inventor: Jason Gauci, Cumming, GA (US)

(73) Assignee: LUND MOTION PRODUCTS, INC., Buford, GA (US)

( * ) Notice: Subject to any disclaimer, the term of this patent is extended or adjusted under 35 U.S.C. 154(b) by 25 days.

(21) Appl. No.: 16/776,841

(22) Filed: Jan. 30, 2020

(65) Prior Publication Data

US 2020/0254859 A1 Aug. 13, 2020

Related U.S. Application Data

(60) Provisional application No. 62/803,909, filed on Feb. 11, 2019.

(51) Int. Cl.
*B60J 7/12* (2006.01)
*B60J 7/185* (2006.01)

(52) U.S. Cl.
CPC ........... *B60J 7/1265* (2013.01); *B60J 7/1234* (2013.01); *B60J 7/1291* (2013.01); *B60J 7/1851* (2013.01)

(58) Field of Classification Search
CPC ...... B60J 7/1265; B60J 7/1234; B60J 7/1239; B60J 7/1291; B60J 7/1851
USPC ...... 296/111, 108, 118, 122, 107.02, 107.11, 296/107.17, 100.06, 107.16, 216.03, 296/216.02, 107.09, 219
See application file for complete search history.

(56) References Cited

U.S. PATENT DOCUMENTS

| | | | |
|---|---|---|---|
| D259,340 S | 5/1981 | Stengel | |
| 4,898,420 A | 2/1990 | Takada | |
| D318,446 S | 7/1991 | Magyar | |
| D322,055 S | 12/1991 | Bruce | |
| 5,299,850 A | 4/1994 | Kaneko | |
| 5,364,154 A | 11/1994 | Kaiser | |
| 5,511,844 A | 4/1996 | Boardman | |
| 5,673,959 A * | 10/1997 | Padlo | B60J 7/1265 296/114 |
| 5,678,882 A | 10/1997 | Hammond | |
| D394,638 S | 5/1998 | Weiner | |
| D397,669 S | 9/1998 | Komick | |

(Continued)

FOREIGN PATENT DOCUMENTS

| | | |
|---|---|---|
| CN | 2174368 Y | 8/1994 |
| DE | 10147017 | 4/2003 |

(Continued)

OTHER PUBLICATIONS

Winchline.com/Viking_Soft_Tops, Viking Fast Back Soft Top, as existed on Feb. 24, 2009, accessed via the Internet Archive WayBack Machine on Jul. 23, 2012 at https://web.archive.org/web/20090224032201/http://winchline.com/viking_soft_ tops.htm.

*Primary Examiner* — Joseph D. Pape
(74) *Attorney, Agent, or Firm* — Knobbe, Martens, Olson & Bear LLP

(57) ABSTRACT

Disclosed herein are embodiments of a rear mounted folding top assembly for use with a vehicle. The folding top assembly can create an opening on the top of the vehicle by rotating a plurality of arms and folding over a cover. The assembly can be designed and shaped to improve aerodynamics when the vehicle is moving and prevent the buildup of water on the soft cover.

16 Claims, 27 Drawing Sheets

(56) References Cited

U.S. PATENT DOCUMENTS

| | | |
|---|---|---|
| D435,509 S | 12/2000 | Hickman |
| 6,206,450 B1 | 3/2001 | Ide et al. |
| D445,396 S | 7/2001 | Wood |
| 6,305,734 B1 | 10/2001 | Pecho et al. |
| 6,409,248 B1 | 6/2002 | Bores |
| 6,431,635 B2 | 8/2002 | Nicastri |
| 6,439,643 B2 | 8/2002 | Barker |
| 6,827,391 B1 | 12/2004 | Kohn et al. |
| 7,025,404 B1 | 4/2006 | Gilbert |
| 7,029,052 B2 * | 4/2006 | Troeger ................ B60J 7/1265 296/107.19 |
| 7,469,954 B2 | 12/2008 | Fallis, III et al. |
| 7,510,231 B2 | 3/2009 | Lewis et al. |
| 7,523,977 B2 | 4/2009 | Fallis, III et al. |
| 7,828,364 B2 | 11/2010 | Causey |
| 8,056,956 B2 | 11/2011 | Heselhaus |
| 8,132,841 B2 | 3/2012 | Steuernagel et al. |
| D732,460 S | 6/2015 | Seneker |
| 9,216,632 B2 * | 12/2015 | Lewis ................ B60J 7/028 |
| D756,889 S | 5/2016 | Cover |
| 10,065,486 B2 | 9/2018 | Smith et al. |
| 10,532,642 B2 | 1/2020 | Smith et al. |
| 2009/0091156 A1 * | 4/2009 | Neubrand ............. B60J 7/1851 296/121 |
| 2010/0259066 A1 | 10/2010 | Haberl et al. |
| 2011/0233959 A1 | 9/2011 | Cover |
| 2019/0135095 A1 | 5/2019 | Smith |
| 2020/0130486 A1 | 4/2020 | Gauci |
| 2020/0223300 A1 | 7/2020 | Smith |
| 2020/0254859 A1 | 8/2020 | Gauci |

FOREIGN PATENT DOCUMENTS

| | | |
|---|---|---|
| FR | 2349469 | 11/1977 |
| JP | 10-287135 A | 10/1998 |

* cited by examiner

REAR MOUNTED FOLDABLE TOP

INCORPORATION BY REFERENCE

Any and all applications for which a foreign or domestic priority claim is identified in the Application Data Sheet as filed with the present application are hereby incorporated by reference under 37 CFR 1.57.

The present application claims the benefit of U.S. Patent Application No. 62/803,909, filed Feb. 11, 2019, which is hereby incorporated by reference in its entirety herein.

U.S. patent application Ser. No. 15/040,941, filed Feb. 10, 2016, now U.S. Pat. No. 10,065,486, is hereby incorporated by reference in its entirety herein.

BACKGROUND

Field

The present disclosure is generally related to vehicle tops and related methods with specific discussions on vehicle tops that can fold to expose an opening along the top of the vehicle and related methods.

Description of the Related Art

Convertible vehicle tops are configured for retracting or folding to allow drivers the pleasure of driving with the top down. A typical convertible top can be retracted automatically with the push of a button or manually when the car is parked. The typical convertible top is folded upon itself and stowed away at the rear of the vehicle to expose the entire vehicle top.

SUMMARY

Disclosed herein are embodiments of a folding top assembly for covering an opening of a vehicle, the folding top assembly comprising a folding frame assembly and a cover attached to the folding frame assembly and the vehicle, the folding frame assembly comprising a frame support attached adjacent the opening of the vehicle, a rear link rotatably coupled to the frame support, a front link rotatably coupled to the frame support proximal of the rear link, and a center link assembly rotatably coupled to both the rear link and the front link, the center link assembly is movable between a closed position and an open position, wherein in the open position, the opening is exposed and the cover folds upon itself; in the closed position, the opening is covered.

Also disclosed herein are embodiments of a folding top assembly for covering an opening of a vehicle, the folding top assembly comprising a folding frame assembly and a cover attached to the folding frame assembly and the vehicle, the folding frame assembly comprising a first and second frame support, a rear support beam, a first and second link rotatably coupled to the rear support beam, a cover support extending from adjacent a first side of the cover to adjacent a second side of the cover and rotatably coupled to both the first link and the second link, the cover support is movable between a closed position and an open position, wherein in the open position, the opening is exposed and the cover folds rearward, and wherein in the closed position, the opening is covered.

Also disclosed herein are embodiments of a folding top assembly for covering an opening of a vehicle, the folding top assembly comprising a folding frame assembly and a cover attached to the folding frame assembly and the vehicle, the folding frame assembly comprising a frame support, a rear support beam, at least one link rotatably coupled to the rear support beam, a cover support extending from adjacent a first side of the cover to adjacent a second side of the cover and rotatably coupled to the at least one link, the cover support is movable between a closed position and an open position, wherein in the open position, the opening is exposed and the cover folds rearward, and wherein in the closed position, the opening is covered.

Also disclosed herein are embodiments of a folding top assembly for covering an opening of a vehicle, the folding top assembly comprising a folding frame assembly and a cover attached to the folding frame assembly and the vehicle, the folding frame assembly comprising a first and second frame support, a rear support beam, a cross beam spaced apart from and forward of the rear support beam, at least one link rotatably coupled to the cross beam, a cover support extending from adjacent a first side of the cover to adjacent a second side of the cover and rotatably coupled to the at least one link, the cover support is movable between a closed position and an open position, wherein in the open position, the opening is exposed and the cover folds rearward, and wherein in the closed position, the opening is covered. In some embodiments, the cross beam extends between the first frame support and the second frame support. In some embodiments, the cross beam is spaced apart from and rearward of a front edge of the opening of the vehicle.

Also disclosed herein are embodiments of a method for using a folding top assembly covering an opening of a vehicle, the method comprising unlatching the folding top assembly, pressing the folding top assembly upwards, and moving the folding top assembly backwards to expose the opening.

Also disclosed herein are embodiments of a movable top assembly for covering the top of a vehicle comprising a frame structure coupled to a vehicle, a cover configured to attach to the frame structure and at least partially cover the vehicle, wherein the cover and frame are configured to move to a plurality of different positions to expose different portions of the vehicle.

Disclosed herein are embodiments of a folding top assembly for covering an opening of a vehicle, the folding top assembly comprising a folding frame assembly and a cover attached to the folding frame assembly and the vehicle, the folding frame assembly comprising a frame support including a base, a rear link rotatably coupled to the frame support, a front link rotatably coupled to the frame support proximal of the rear link, and a cover support extending from adjacent a first side of the cover to adjacent a second side of the cover and rotatably coupled to both the rear link and the front link, the cover support is movable between a closed position and an open position, wherein in the open position, the opening is exposed and the cover folds upon itself, and wherein in the closed position, the opening is covered.

In some embodiments, the cover support can be sloped downwards from back to front in the open position. In some embodiments, the rear link can comprise a pair of rotatable arms and the front link comprises a pair of rotatable arms. In some embodiments, the folding frame assembly can comprise a parallelogram linkage.

In some embodiments, the front link can pivot about on an axis a shorter distance from the base than a distance between an axis about which the rear link pivots and the base. In some embodiments, the cover support can comprise a single-piece bar configured to form the front and side perimeters of the folding frame assembly. In some embodiments, the single-piece bar can be bowed on both the front perimeter and side perimeters. In some embodiments, the assembly can further comprise a pair of cover attachment components connected to the side perimeters of the single-piece bar, the cover attachment components each having a channel configured to retain a portion of the cover.

Also disclosed herein are embodiments of a method for using a soft cover and folding top assembly covering an opening of a vehicle, the method comprising unlatching the folding top assembly comprising a frame support attached adjacent the opening of the vehicle, a rear link rotatably coupled to the frame support, a front link rotatably coupled to the frame support proximal of the rear link, and a cover support assembly rotatably coupled to both the rear link and the front link, the center link assembly being movable between a closed position and an open position, pressing the folding top assembly upwards, and moving the folding top assembly backwards to expose the opening and fold the soft cover upon itself.

In some embodiments, the cover can be a non-folding panel. In some embodiments, the first link can comprise a pair of rotatable arms. In some embodiments, the second link can comprise a pair of rotatable arms. In some embodiments, at least one of the first link and the second link can be adjustable in length. In some embodiments, the arms can have a proximal segment and a distal segment. In some embodiments, the proximal segment can surround the distal segment. In some embodiments, at least one of the first link and the second link can be collapsible. In some embodiments, the first and second links can include a hinge and a collar. The collar can be slidably engaged to the links. In some embodiments, the first and second links can be spaced apart from the first and second frame supports. In some embodiments, the folding frame assembly can include a front attachment bar and a front support beam. The front attachment bar can be configured to couple to the front support beam. The front support beam can be positioned between the front attachment bar and a windshield of the vehicle. In some embodiments, the folding frame assembly can include a cross beam. The cross beam can be spaced apart from and forward of the rear support beam.

In some embodiments, the cover support can be sloped downwards from back to front in the open position. In some embodiments, the rear link can comprise a pair of rotatable arms and the front link comprises a pair of rotatable arms. In some embodiments, the folding frame assembly can comprise a parallelogram linkage.

In some embodiments, the front link can pivot about on an axis a shorter distance from the base than a distance between an axis about which the rear link pivots and the base. In some embodiments, the cover support can comprise a single-piece bar configured to form the front and side perimeters of the folding frame assembly.

In some embodiments, the single-piece bar can be bowed on both the front perimeter and side perimeters. In some embodiments, the assembly can further comprise a pair of cover attachment components connected to the side perimeters of the single-piece bar, the cover attachment components each having a channel configured to retain a portion of the cover.

Also disclosed herein are embodiments of a foldable soft cover assembly for use on a vehicle, the assembly comprising a first pair of arms, a second pair of arms, a pair of base platforms defining a surface to face the vehicle, each of the pair of base platforms rotatably attached to one of the first pair of arms and one of the second pair of arms, and a top assembly rotatably connected to the first pair of arms and the second pair of arms and a soft cover, wherein the top platform is configured to rotate between an open and closed position, wherein the assembly comprises a parallelogram linkage.

BRIEF DESCRIPTION OF THE DRAWINGS

These and other features and advantages of the present devices, systems, and methods will become appreciated as the same becomes better understood with reference to the specification, claims and appended drawings wherein:

DETAILED DESCRIPTION

The detailed description set forth below in connection with the appended drawings is intended as a description of embodiments of folding tops provided in accordance with aspects of the present devices, systems, and methods and is not intended to represent the only forms in which the present devices, systems, and methods may be constructed or utilized. The description sets forth the features and the steps for constructing and using the embodiments of the present devices, systems, and methods in connection with the illustrated embodiments. It is to be understood, however, that the same or equivalent functions and structures may be accomplished by different embodiments that are also intended to be encompassed within the spirit and scope of the present disclosure. As denoted elsewhere herein, like element numbers are intended to indicate like or similar elements or features.

FIGS. 1A-3 illustrate three different positions of one embodiment of a folding top assembly 10 assembled on a vehicle 100, such as a Jeep Wrangler, though the particular vehicle does not limit the disclosure. The folding top assembly 10 can be quickly and conveniently installed on a roof or opening 12 of the vehicle 100, such as to the roll bar of the vehicle, as an original convertible top or a replacement top without the need for additional bows or support hardware. In the illustrated embodiment, the folding top 10 fits snugly over an original equipment factory roll bar of the vehicle 100. Further, reference to the words front, rear, left, and right are understood to be based on positions of a vehicle, such as front, rear, left, and right side of the vehicle.

Figure 1A:
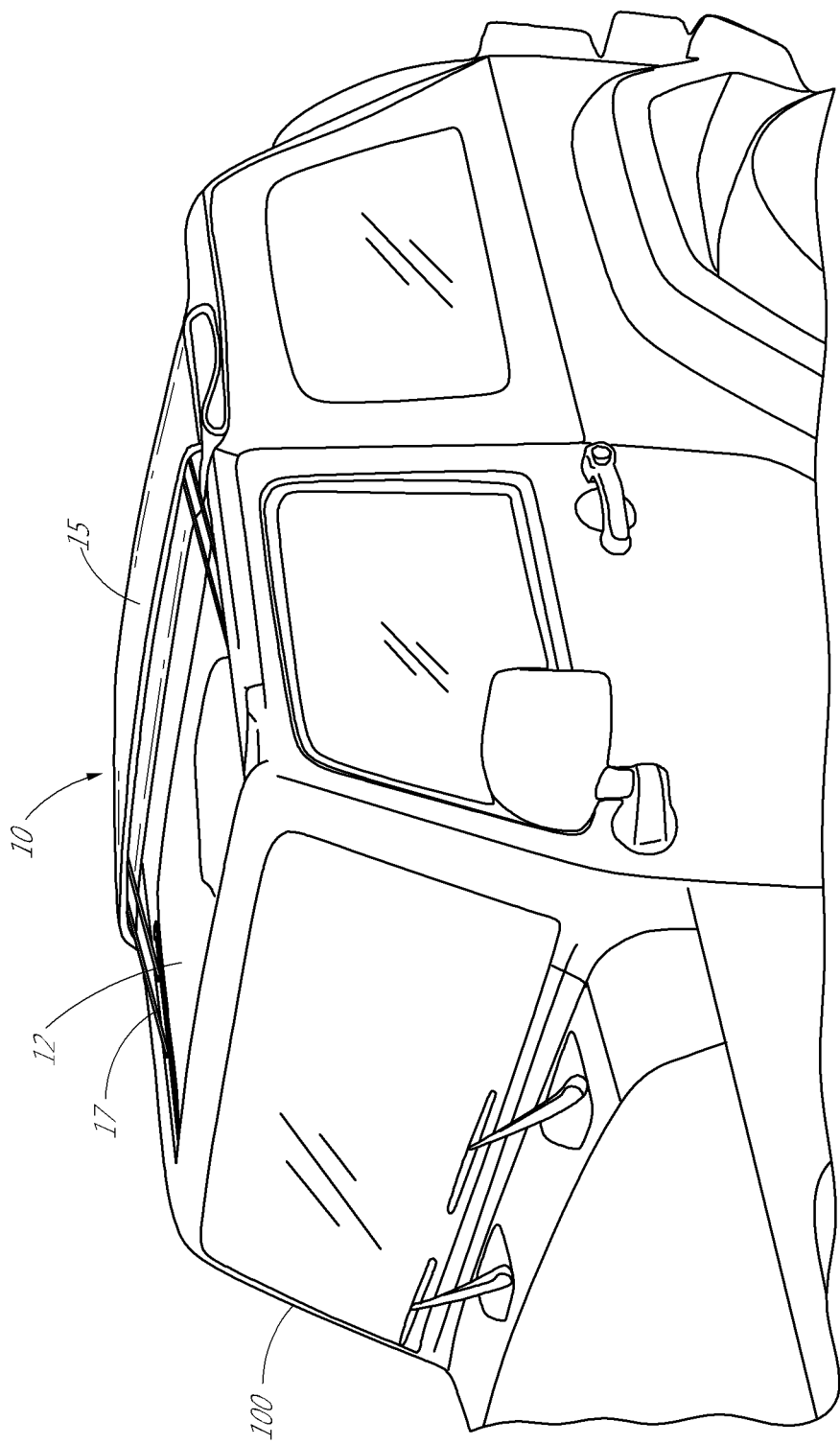
FIG. 1A shows a front perspective view of an embodiment of a folding top assembly in an open position assembled on a vehicle, the folding top assembly including a folding frame assembly and a cover.
Figure 1B:
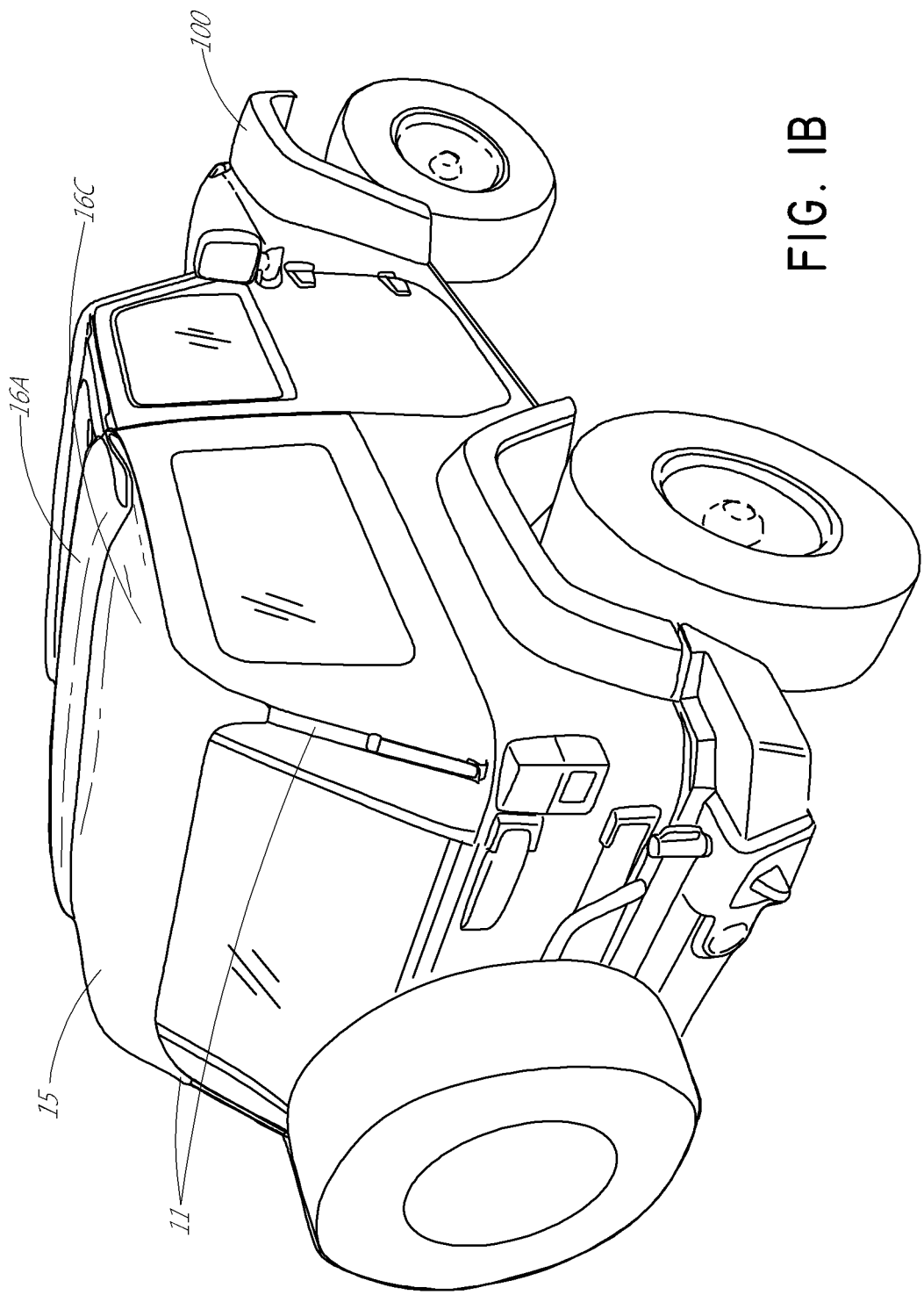
FIG. 1B shows a rear perspective view of the folding top assembly of FIG. 1A on the vehicle.

FIGS. 1A and 1B shows the folding top assembly 10 in an open or exposed position, with the folding top assembly 10 partially folded over upon itself to expose the opening 12, which is smaller in dimension or size compared to the total top surface of the vehicle 100 and may be called a sunroof opening or moonroof opening 12. The open position described above and shown in FIGS. 1A and 1B can be a different configuration than the entire folding top assembly 10 folded and tucked away to expose the entire top of the vehicle. As the top assembly 10 is only partially opened, or partially folded, the folded section exposes the opening 12 of the vehicle 100 similar to that of a sunroof or moonroof while the rear part of the vehicle is in a covered state and covered by the rear part of the soft top assembly 10. This folding capability provides the driver and passengers of the vehicle 100 having the soft top 10 with a semi-open environment of a sunroof or moonroof. Previously, the driver of the vehicle 100 is presented with only two options, either a fully enclosed soft top or a soft top that is completely folded and tucked away to expose substantially the entire top area of the vehicle. In this open position configuration of FIGS. 1A and 1B, the vehicle 100 can be driven safely while providing the driver and his passengers with the open experience of a convertible top.

As shown, the folding top assembly 10 can include at least a soft cover 15 and a folding frame assembly 17. The soft cover 15 is folded over the folding frame assembly 17 and the top of the vehicle 100. The term "soft" in soft cover is understood to mean a cover that is bendable and/or foldable. A hard cover would imply that the cover is not foldable and/or bendable along the cover itself, unless folded along parting joints or seams. In some embodiments, the soft cover 15 is made from conventional materials, such as plastic or canvas as an example.

Figure 2:
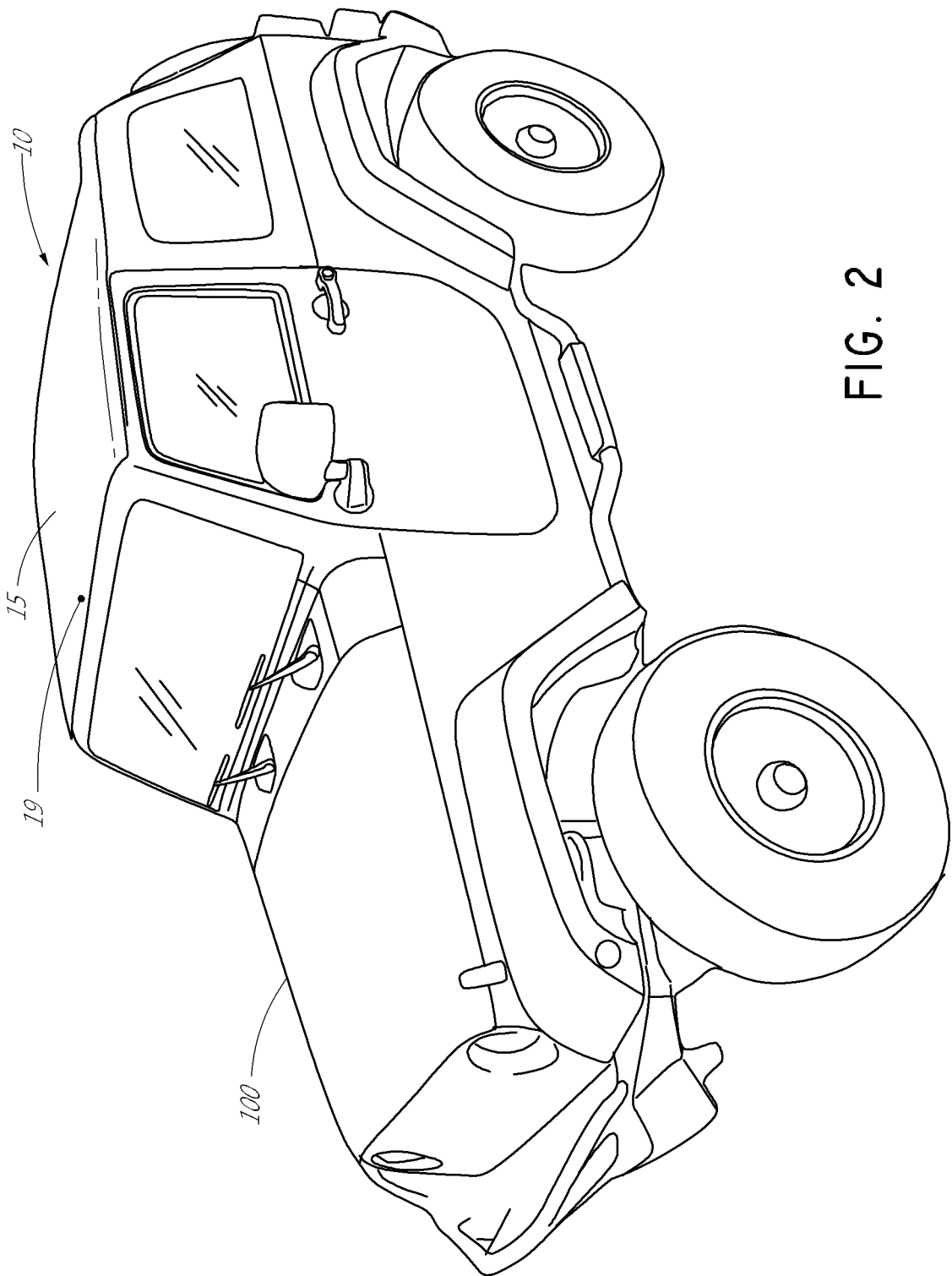
FIG. 2 shows a front perspective view of the folding top assembly in a closed position on the vehicle.

FIG. 2 shows the folding top assembly 10 in a closed or covered position, with the folding top assembly 10 completely covering the top of the vehicle 100 and only the soft cover 15 is shown in an extended or covered state. In this position, a leading portion 19 of the folding top assembly 10 can be latched (or otherwise attached) to the vehicle 100 to maintain the folding top assembly 10 in the closed position, as further discussed below.

Figure 3:
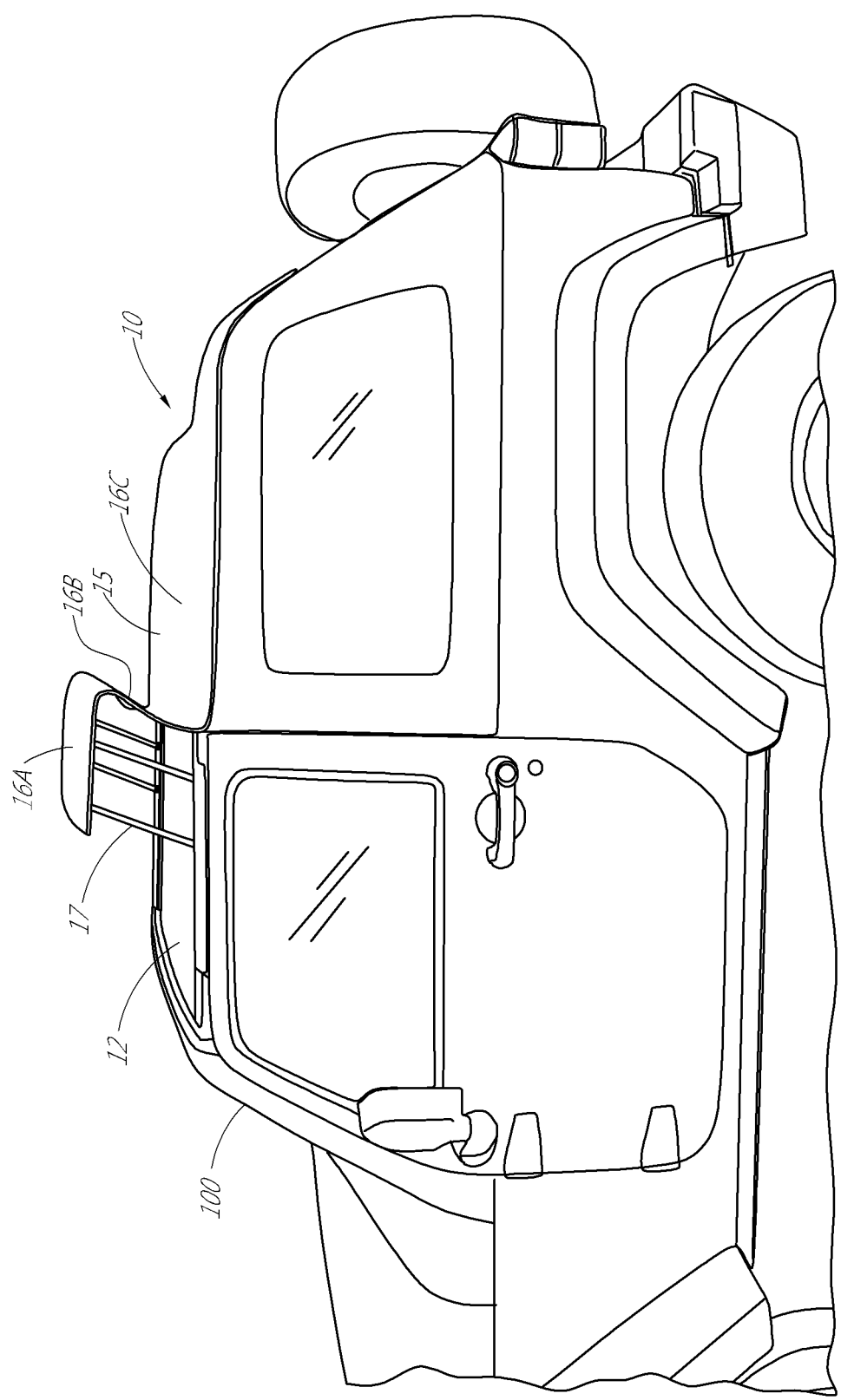
FIG. 3 shows a side view of the folding top assembly in an intermediate position on the vehicle.

FIG. 3 shows the folding top assembly 10 in an intermediate position in which the folding top assembly 10 is either in the process of transitioning from the open position of FIGS. 1A and 1B to the closed position of FIG. 2, or vice versa. In one example, from the closed position of FIG. 2, a front portion 16A of the folding top assembly 10, which may also be referred to as the convertible portion or the movable portion, can be manually pushed upwards and then rearwards by a user, such as a driver or passenger of the vehicle 100, to an intermediate position between the open position of FIGS. 1A and 1B and the closed position of FIG. 2. At a certain transition point in the intermediate position, a folding portion 16B of the folding top assembly 10, adjacent the front portion 16A, folds back under the weight of the front portion 16A and/or the momentum of the front portion 16A of the folding top assembly 10. That is, at the transition point, the user no longer needs to apply a force to the front portion 16A of the folding top assembly 10 to bring the folding top assembly 10 to the open position. The back portion 16C of the folding top assembly is adjacent to the folding portion 16B and attached to the vehicle 100. In one example, the back portion 16C has adjustable straps 11 (FIG. 1B) that extend from opposite corners of the back portion 16C to strap the back portion to the vehicle 100. The adjustable straps 11 can be tightened to increase tension in the soft cover 15 to make the soft cover taut over the opening 12 of the vehicle 100.

Figure 4:
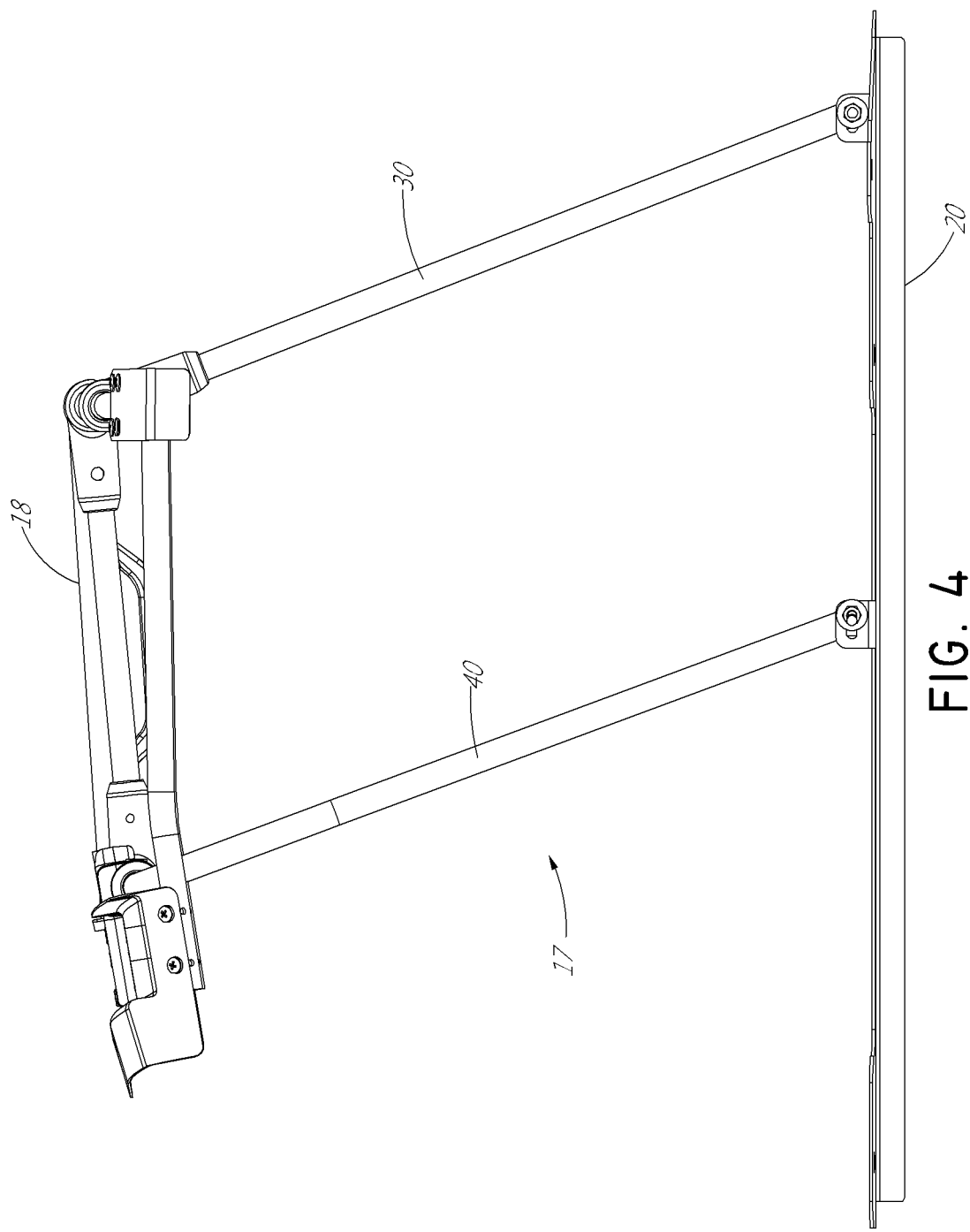
FIG. 4 shows a side view of the folding frame assembly in the intermediate position.
Figure 7:
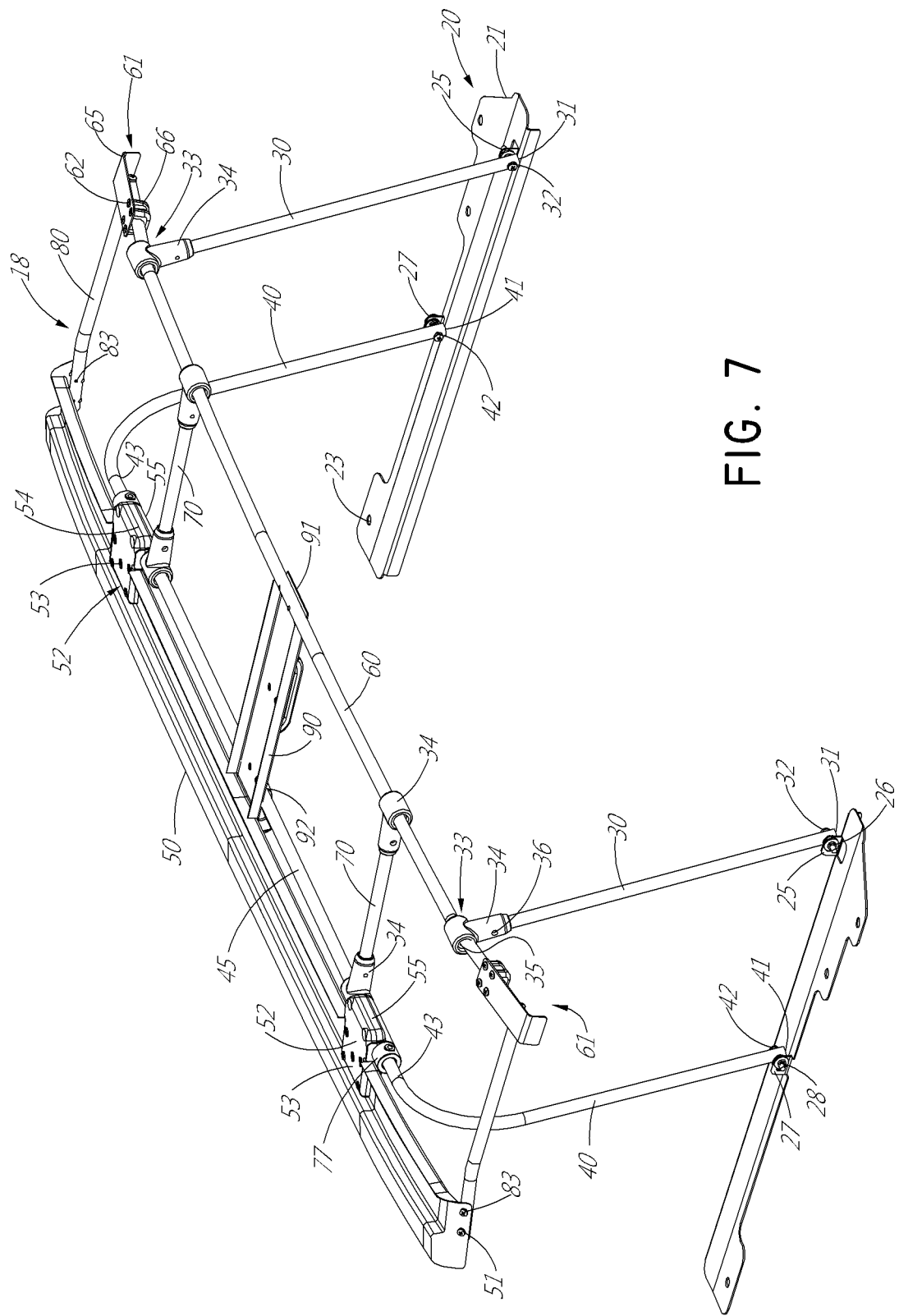
FIG. 7 shows a perspective view of an embodiment of the folding frame assembly in an intermediate position.

FIG. 4 illustrates an embodiment of a folding frame assembly 17 usable to move or fold portions of the soft cover 15 from a closed position to an intermediate position and to an open position, and for moving the soft cover in the reverse direction, as shown in FIGS. 1A-3. As shown in FIG. 4, the folding frame assembly 17 is in an intermediate position, similar to that shown in FIG. 3. The folding frame assembly 17 includes a frame bracket comprising two frame supports 20, a pair of rear links 30 rotatably coupled to the two frame supports 20, a pair of front links 40 also rotatably coupled to the two frame supports 20 but closer to the front of the vehicle 100 than the rear links 30, and a center link assembly 18 rotatably coupled to the front links 40 and the rear links 30. The two front links 40 and the two rear links 30 are mounted to the two frame supports 20, respectively, as shown in FIG. 7, to then mount on the left and right side of the vehicle. The movement of the folding frame assembly 17 is a four bar linkage mechanism movement, such as a parallelogram linkage. The soft cover 15 can be attached to a first pivot region between the rear link 30 and the center link assembly 18 and a second pivot region between the rear link 30 and the frame support 20.

Figure 5:
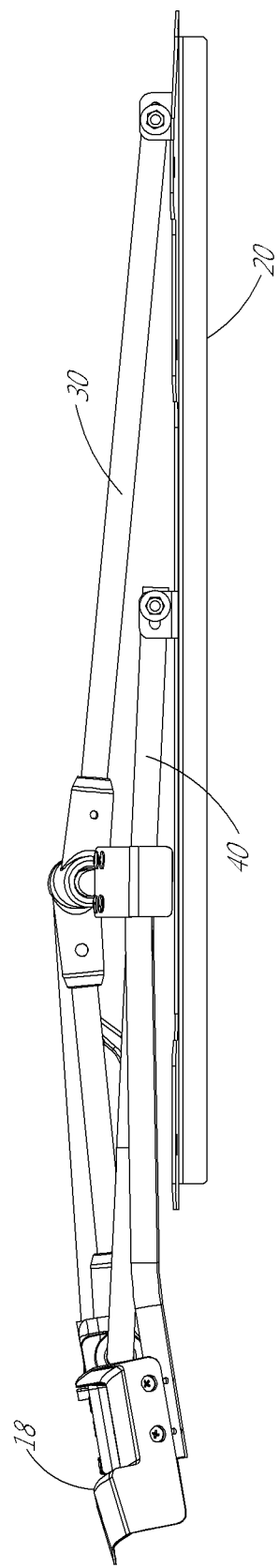
FIG. 5 shows a side view of the folding frame assembly in the closed position.

FIG. 5 illustrates the folding frame assembly 17 in the closed position, similar to that shown in FIG. 2, with the center link assembly 18 moved to a forward position or towards the front of the vehicle 100 to cover the sunroof opening 12 of the vehicle 100.

Figure 6:
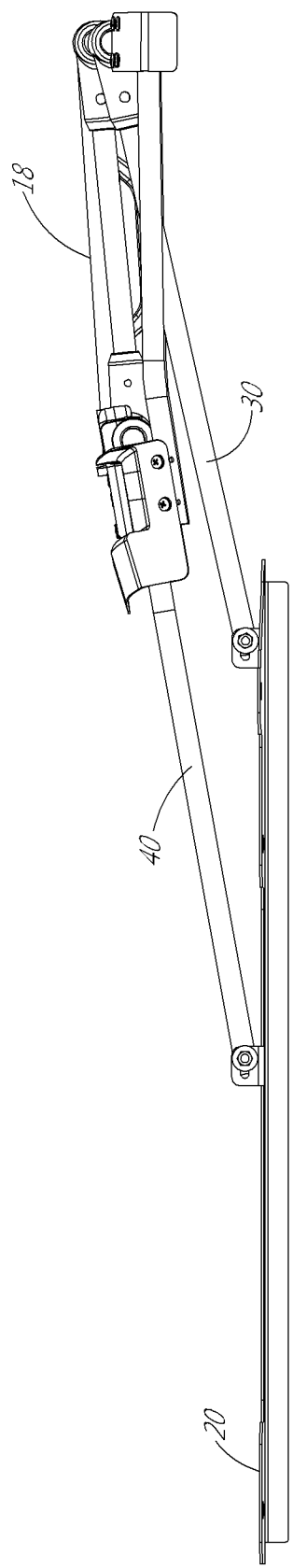
FIG. 6 shows a side view of the folding frame assembly in the open position.

FIG. 6 illustrates the folding frame assembly 17 in the open position, similar to that shown in FIGS. 1A and 1B, with the center link assembly 18 moved to a rear position or away from the front of the vehicle and towards the rear of the vehicle to expose the sunroof opening 12 of the vehicle 100. Because the soft cover 15 is attached at the pivot regions, the folding portion 16B, defined between the first and second pivot regions, can be folded neatly with the folding frame assembly 17, with the front portion 16A positioned above the folding portion 16B.

Figure 8:
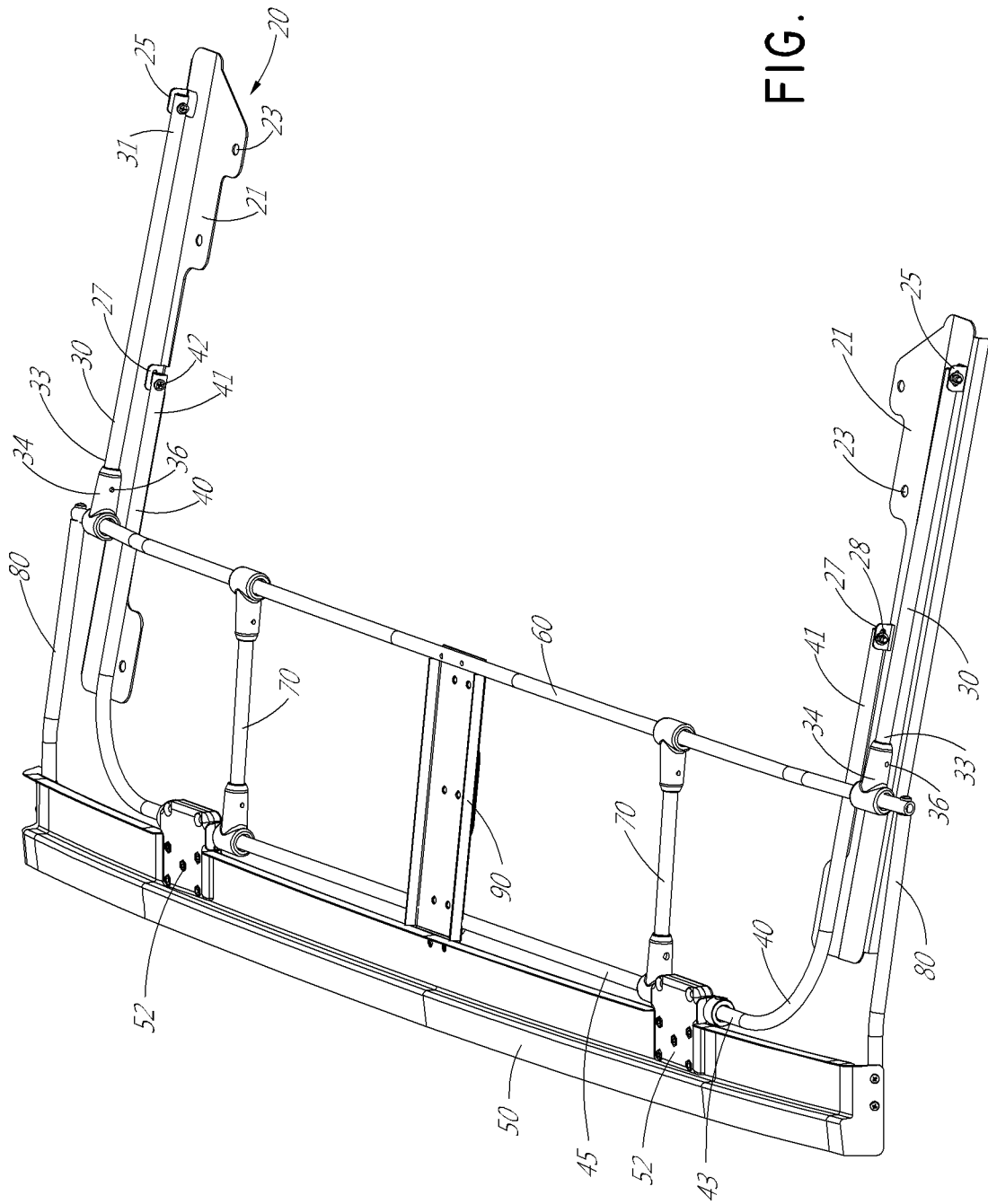
FIG. 8 shows a perspective view of an embodiment of the folding frame assembly in a closed position.
Figure 9:
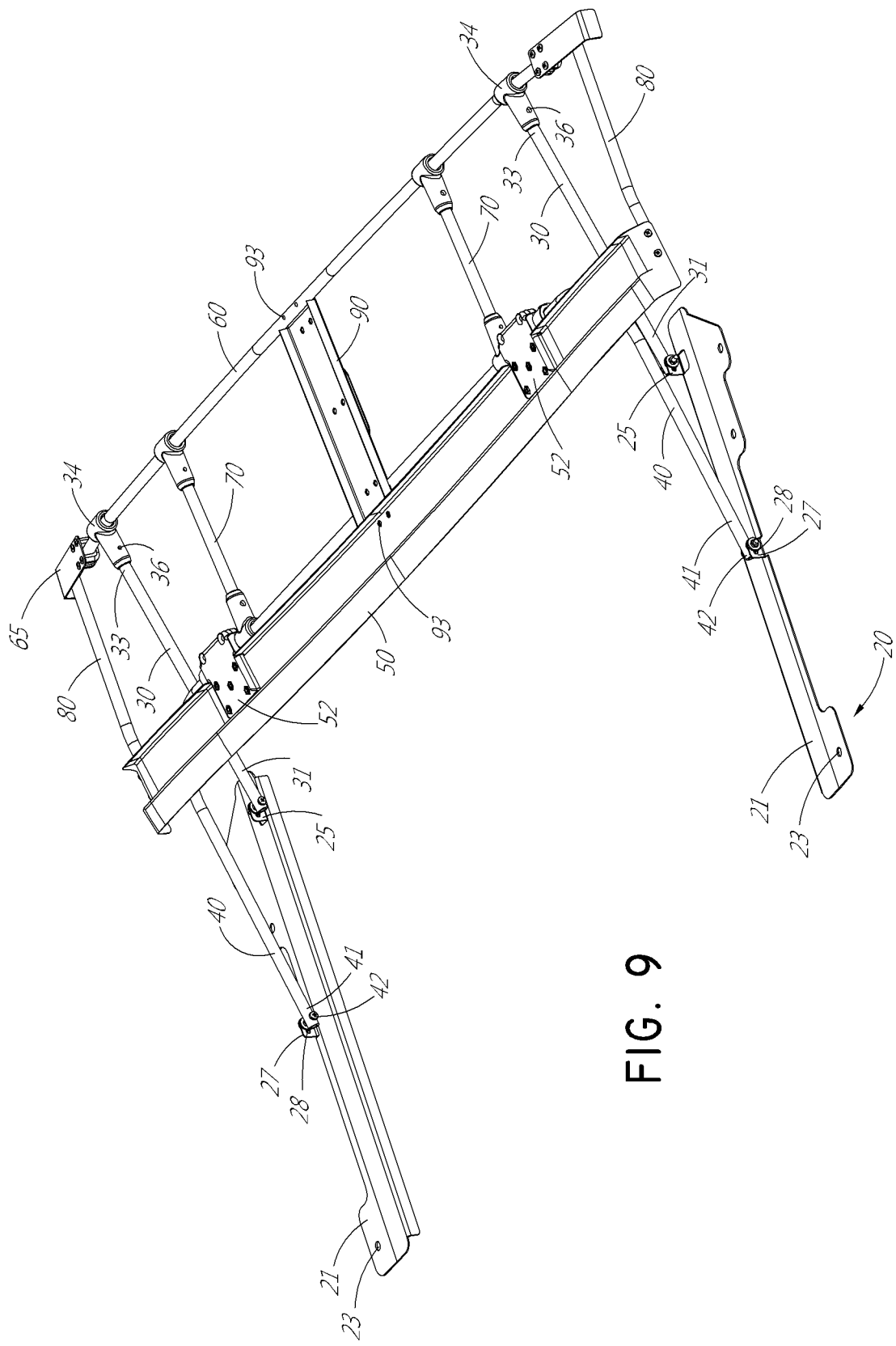
FIG. 9 shows a perspective view of an embodiment of the folding frame assembly in the open position.

Referring to FIGS. 7-9, the two frame supports 20 are attached to a rear link 30 and a front link 40. The two separate frame supports 20 are configured to attach to the vehicle 100, preferably the left and right side of the top of the vehicle 100. In the illustrated embodiment, the two separate frame supports 20 are configured to attach to opposite sides, as opposed to front and rear, of the sunroof opening 12 of the vehicle 100, with each frame support 20 extending in the forward and aft direction of the vehicle 100. In an embodiment, the frame supports 20 are symmetrically identical to each other. Each frame support 20 has a base 21, an aft tab 25, and a forward tab 27 extending from the base 21. The base 21 has a plurality of mounting holes 23 to firmly secure the frame support 20 to the vehicle 100, such as by using screws or fasteners. The mounting holes 23 are sized and located to correspond with mounting holes on the vehicle 100. The shape of the base 21 should not interfere with the function of other components of the vehicle 100 or the user. The pair of frame supports 20 are mounted on opposite sides of the top of the vehicle 100 adjacent the driver and passenger door frame, respectively. The aft and forward tabs 25, 27 extend upwardly, preferably substantially perpendicularly away from the mounting surface of the base 21. The aft and forward tabs 25, 27 each define a hole 26, 28, respectively, which can be slots. The aft tab 25 is rotatably coupled to the rear link 30, and the forward tab 27 is rotatably coupled to the front link 50. The aft and forward tabs 25, 27 are also staggered horizontally or side to side so that the rear links 30 and the front link 40 do not interfere with each other when the folding top assembly 10 is in either the open position or closed position. In one example, the rear links 30 sit inside the front links 40 when in the closed position and open position to prevent interference when moving from one position to another. In another example, the rear links 30 sit outside the front links 40. The aft tabs 25 can be located inside of the forward tabs 27, or outside of the forward tabs 27. The forward and aft tabs 25, 27 can be formed by punching the tabs from the base 21 and bending the tabs upwards.

The rear link 30 is rotatably coupled to a corresponding frame support 20 at a first end 31 of the rear link 30. In the illustrated embodiment, the first end 31 of the rear link 30 is rotatably coupled to the aft tab 25. The first end 31 defines a hole 32 corresponding to the hole 26 of the aft tab 25. A fastener or rod extends through the hole 32 of the first end 31 of the rear link 30 and the hole 26 of the aft tab 25, so that the rear link 30 is pivotable about the fastener. The rear link 30 is also rotatably coupled to the center link assembly 18 at a second end 33 of the rear link 30. In the illustrated embodiment, the second end 33 forms a collar 34 rotatably coupled to center link assembly 80. The collar 34 can also be a separate piece fixed to the second end 33 of the rear link 30 with a set screw 36 to firmly fix the collar 34 to the rear link 30. The collar 34 defines a hole 35 to receive a rod or bar, such as the aft bar 60, and rotate around the rod or bar. In another embodiment, an insert, such as a plastic ring or ball bearing, can be formed or disposed in the hole 35 of the collar 34 to provide a tighter fit and smooth rotation between the hole 35 and the rod or bar rotating inside the hole 35. It is understood that the first end 31 of the rear link 30 can also have a collar 34 to rotate around the rod or fastener.

The front link 40 is rotatably coupled to the corresponding frame support 20 at a first end 41 of the front link 40. In the illustrated embodiment, the first end 41 of the front link 40 is rotatably coupled to the forward tab 27. The first end 41 defines a hole 42 corresponding to the hole 28 of the forward tab 27. A fastener or rod extends through the hole 42 of the first end 41 of the front link 40 and the hole 28 of the forward tab 27, so that the front link 40 is pivotable about the fastener. It is understood that the first end 41 of the front link 40 can also have a collar 34 to rotate around the rod or fastener. The front link 40 is also rotatably coupled to the center link assembly 18 at a second end 43 of the front link 40. In the illustrated embodiment, the front link 40 is a U-shaped bar with the second ends 43 connected by a horizontal link 45. The horizontal link 45 is rounded or tubular. In other embodiments, the front link 40 is substantially similar to the rear link 30, and the horizontal link 45 can be rotatably coupled to the front link 40 or fixed to the front link 40.

The center link assembly 18 is rotatably coupled to the rear and front links 30, 40. The center link assembly 18 is configured to support the front portion 16A. A leading edge of the front portion 16A is secured to a front end of the center link assembly 18, and the folding portion 16B can be secured to a back end of the center link assembly 18. In the illustrated embodiment, the center link assembly 18 includes a front attachment bar 50, an aft bar 60, a pair of crosslinks 70, a pair of outer links 80, and a center attachment 90.

The front attachment bar 50 is configured to engage and latch to the vehicle 100 at the closed position. The soft cover 15 can be wrapped around a nose or leading edge of the front attachment bar 50 and attached to the front attachment bar 50 or to itself underneath the soft cover 15, using buttons, snaps, Velcro, zippers, or other securing means. In the illustrated embodiment, a pair of attachment mounts 52 attached to the attachment bar 50 and spaced apart adjacent to the second ends 43 of the front link 40 to provide a more stable structure. A front end 53 of the attachment mount 52 is fixed to the front attachment bar 50 by fasteners, tack welding, or other fixing means. Alternatively, the attachment mounts can be integrally formed with the front attachment bar 50. A back end 54 of the attachment mount 52 forms a grip 55 around the horizontal link 45. An internal diameter of the grip 55 and an outer diameter of the horizontal link 45 can be closely matched to minimize wiggle room between the grip 55 and the horizontal link 45 and provide a smooth rotation. In another embodiment, an insert, such as a plastic ring or ball bearing, between the grip 55 and horizontal link 45 interface can provide a tighter fit and smooth rotation between the grip 55 and the horizontal link 45. In yet another embodiment, the attachment mount 52 is two separate pieces fastened together to form the attachment mount 52.

The aft bar 60 is substantially parallel to the horizontal link 45 to prevent binding when the folding frame assembly 17 moves from the open to the closed position and vice versa. The aft bar 60 is coupled to the front attachment bar 50 by crosslinks 70, outer links 80, and/or a center attachment 90. The aft bar 60 is preferably rounded and slips through the collars 34 of the rear links 30 and attach to outer links 80 at opposite ends 61 of the aft bar 60. Thus, the second ends 33 of the rear links 30 rotate about the aft bar 60. The aft bar 60 can be bent at various locations to help define the contour of the folding top assembly 10.

In other embodiments, if the front links 40 are substantially similar in design and overall shape as the rear links 30, then the horizontal link 45 can be fixed with the center link assembly 18, similar to the aft bar 60, and the front links 30 would then rotate around the horizontal link 45.

An anchor 65 is attached and fixed at the ends 61 of the aft bar 60. The anchor 65 is configured for engaging with a recess or lip on the vehicle 100 to aid in maintaining the folding top assembly 10 in the closed position. The anchor 65 can also help pull the soft cover 15 of the folding top assembly 10 towards the opposite sides of the vehicle 100 thereby increasing tension or tautness of the soft cover 15. In one embodiment, one or more U-shaped clamps 66 clamp onto the end 61 of the aft bar 60 to fix the anchor 65 to the aft bar 60. In the illustrated embodiment, the anchor 65 is an L-shaped plate with four through holes 62 to tighten the U-shaped clamps 66 onto the aft bar 60. The L-shaped plate extends towards the vehicle 100 and helps seat the folding frame assembly 10 to the vehicle 100.

In the illustrated embodiment of FIG. 7, the crosslinks 70 are disposed adjacent and inside the attachment mounts 52. In the illustrated embodiment of FIG. 10, the crosslinks 70 are disposed adjacent the attachment mounts 52, but outside the attachment mounts 52. The crosslinks 70 have a first end 71 and a second end 72 thereof. The crosslinks 70 have collars 34 on both the first end 71 and the second end 72 or only on the end where rotation is necessary. The first end 71 of the crosslink 70 is rotatably coupled to the horizontal link 45 of the front link 40. The second end 72 of the crosslink 70 is rotatably coupled or preferably fixed to the aft bar 60 to prevent the crosslink 70 from sliding horizontally along the horizontal link 45 and the aft bar 60. Additionally, fixing the second end 72 of the crosslink 70 to the aft bar 60 can also help prevent the front attachment bar 50 from sliding left to right along the horizontal link 45. A lock collar 77 can be installed on the horizontal link 45 adjacent the attachment mounts 52 or the crosslinks 70 to prevent the front attachment bar 50 or crosslinks 70 from sliding in a horizontal direction along the horizontal link 45.

Each crosslink 70 couples the horizontal link 45 to the aft bar 60. In one embodiment, the crosslink has collars 34 formed at a first end 71 and a second opposite end 72. The aft bar 60 slips through both collars 34 at the first ends 71 of the two crosslinks 70. The horizontal link 45 slips through both collars 34 at the second ends of the two crosslinks 70. Preferably, the collars 34 at the second ends abut against the grip 55 of the front attachment bar 50 to prevent the front attachment bar 50 from shifting side to side, thereby securing the front attachment bar 50 to only rotate with no translation normal to rotation. The crosslinks 70 can be attached outside or inside the grip 55 of the front attachment bar 50.

The outer links 80 couple ends of the front attachment bar 50 to ends of the aft bar 60. The front attachment bar 50 is fixed to first ends 81 of the outer links 80, and the aft bar is fixed to second ends 82 of the outer links 80 to form a rigid structure. In one example, the front attachment bar 50 can have a plurality of slot or through holes 51 at opposite ends of the front attachment bar 50 corresponding with holes 83 at the first end 81 of the outer link 80. Fasteners can pass through the through holes 51 of the front attachment bar 50 and the holes to fix the front attachment bar 50 to the outer links 80. In another example, the ends 61 of the aft bar 60 have through holes 62 corresponding with tapped holes 84 in second ends 82 of the outer link 80. Fasteners pass through the through holes 62 of the aft bar and threadingly engage with the tapped holes 84 in the outer link 80 to fix the aft bar 60 to the outer links 80.

A center attachment 90 couples the front attachment bar 50 to the aft bar 60. In the illustrated embodiment, a first end 91 of the center attachment 90 is fixed to the aft bar 60 and a second end 92 of the center attachment 90 is fixed to the front attachment bar 50. A plurality of first holes 93 are defined in the first end 91 of the center attachment 90 and aligned with corresponding holes in the aft bar 60. A plurality of second holes 94 are defined in the second end 92 of the center attachment 90 and aligned with corresponding holes in the front attachment bar 50. Fasteners pass through the first and second holes 93, 94 to fix the first and second ends 91, 92 of the center attachment 90 to the aft bar 60 and the front attachment bar 50.

Figure 10:
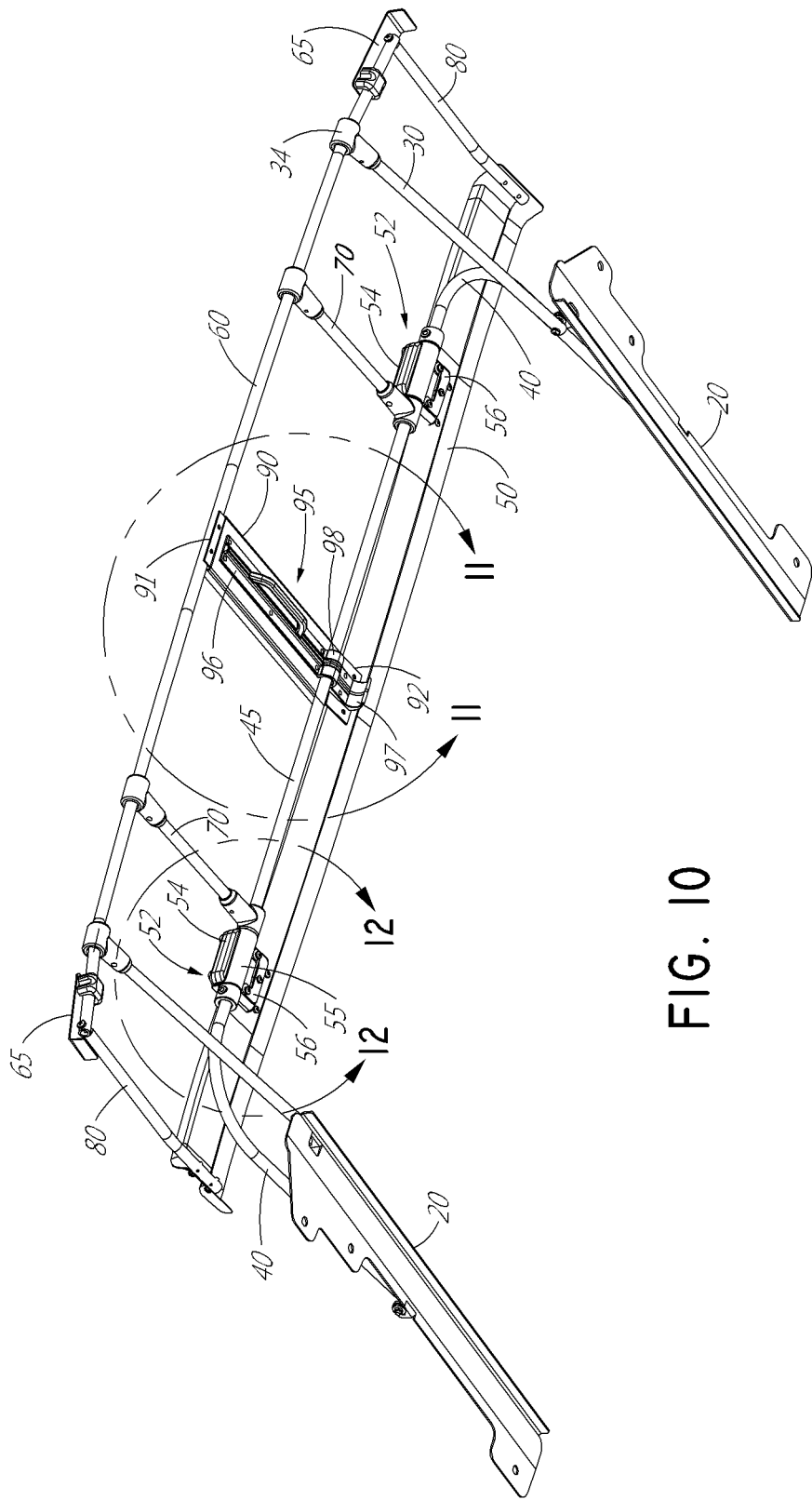
FIG. 10 shows a perspective view of the folding frame assembly in the open position but shown from a different aspect.
Figure 11:
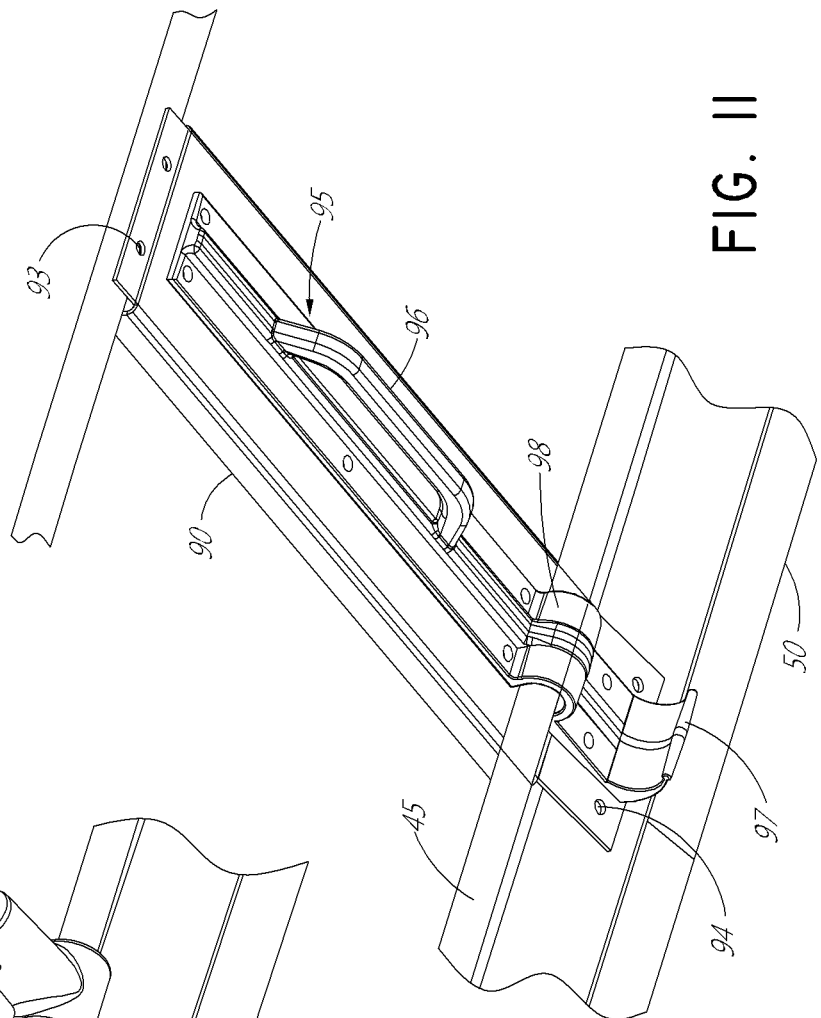
FIG. 11 shows an enlarged view of circled portion 11-11 of FIG. 10.

Referring to FIG. 10, a grip assembly 95 is mounted beneath the center attachment 90. In the illustrated embodiment of FIG. 11, the grip assembly 95 includes a first handle 96 and a second handle 97 extending from the center attachment 50. The first handle 96 is attached to a center portion of the center attachment 50 by fasteners through mounting holes of the first handle into the center attachment 50. The first handle 96 is configured for a user to facilitate pushing the front portion 16A of the folding top assembly 10 upwards and backwards towards the rear of the vehicle 100, from a closed position to an open position. The second handle 97 is located adjacent to the second end of the center attachment 50 or the front of the vehicle 100. The second handle 97 is configured for the user to reach behind and pull the second handle 97 to bring the front portion 16A from the open position back into the closed position. An overpass 98 in the grip assembly 95 extends from the first handle 96 around the horizontal link 45 and connects to the second handle 97. Thus, the first handle 96 and the second handle 97 can be integrally formed as one piece.

Figure 12:
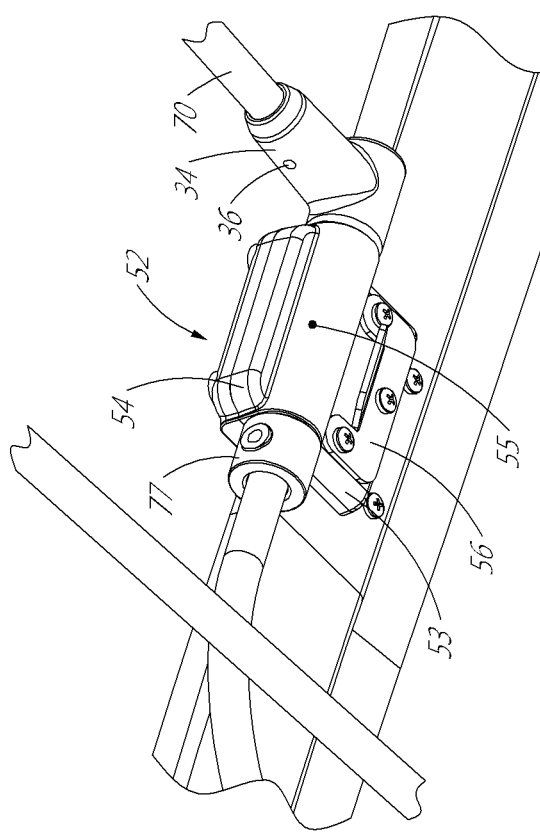
FIG. 12 shows an enlarged view of circled portion 12-12 of FIG. 10.
Figure 13:
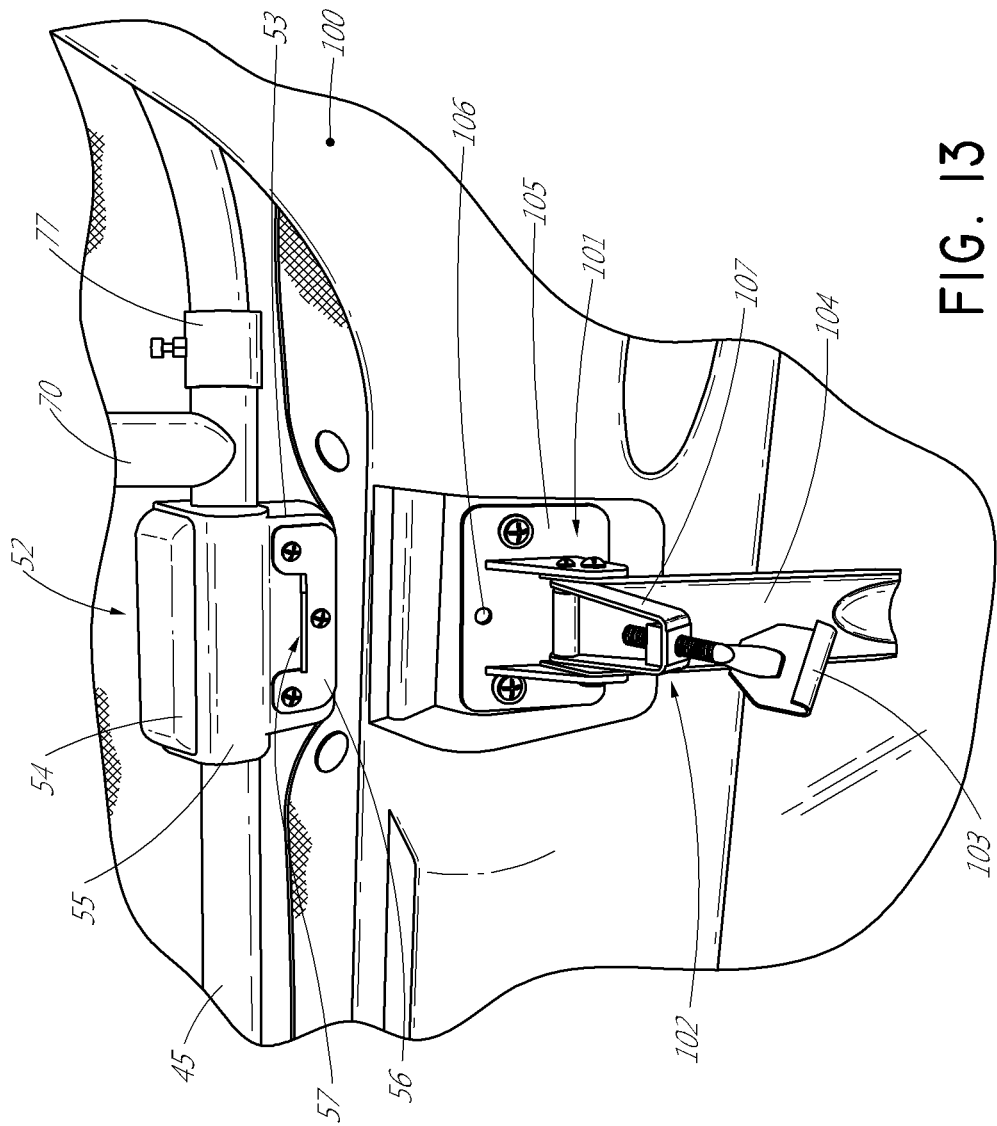
FIG. 13 shows an assembled view of the folding top assembly on the vehicle in the closed position with the folding top assembly unlatched to the vehicle.

Referring to FIGS. 12 and 13, a latching bracket 56 is attached or fastened to the attachment mount 52 to provide engagement with a latch 101 mounted on the vehicle 100 to lock the folding top assembly 10 in the closed position. The latch 101 has a mounting base 105 with mounting holes 106, an engaging piece 102 which engages with the latching bracket 56, and a locking bar 104 which locks the engaging piece 102 with the latching bracket 56 to firmly hold the leading portion 19 of the folding top assembly 10 to the vehicle 100. The mounting holes 106 align with pre-existing tapped holes in the vehicle 100 prior to mounting the latch 101 with threaded fasteners. In the illustrated embodiment, the latching bracket 56 is U-shaped and has an interior cavity or recess 57 cooperatively formed by the latching bracket 56 and a surface of the front end 53 of the attachment mount 52. The engaging piece 102 has an adjustable hook 103 receivable in the recess 57. In one example, the adjustable hook 103 has a hook on one end and an opposite threaded end threadedly engaged with a threaded hole in a base 107 of the engaging piece 102 to provide adjustment along the axis of the adjustable hook 103. To engage in the recess, the adjustable hook 103 is directed slightly above and towards the recess 57 until the hook of the adjustable hook 103 is caught in the recess 57. If the adjustable hook 103 is too short so as to be unable to engage in the recess 57 to secure the front portion of the folding top assembly 10 to the vehicle 100, the length of the adjustable hook 103 can be increased by turning the threaded end with respect to the threaded hole in the base 107 to adjust the length. Similarly if there is too much slack because the length of the adjustable hook 103 is too long, the length of the adjustable hook 103 can be decreased until a suitable length is achieved. The pitch of the threaded end of the adjustable hook 103 determines the degree of length adjustment and correspondingly the amount of force the folding top assembly 10 is held to the vehicle 100. Furthermore, if additional length of the adjustable hook 103 is needed to engage in the recess 57 of the bracket 56, the user can pull on either the first handle 96 or the second handle 97 until the adjustable hook 103 can engage in the recess 57 of the bracket 56.

Figure 14:
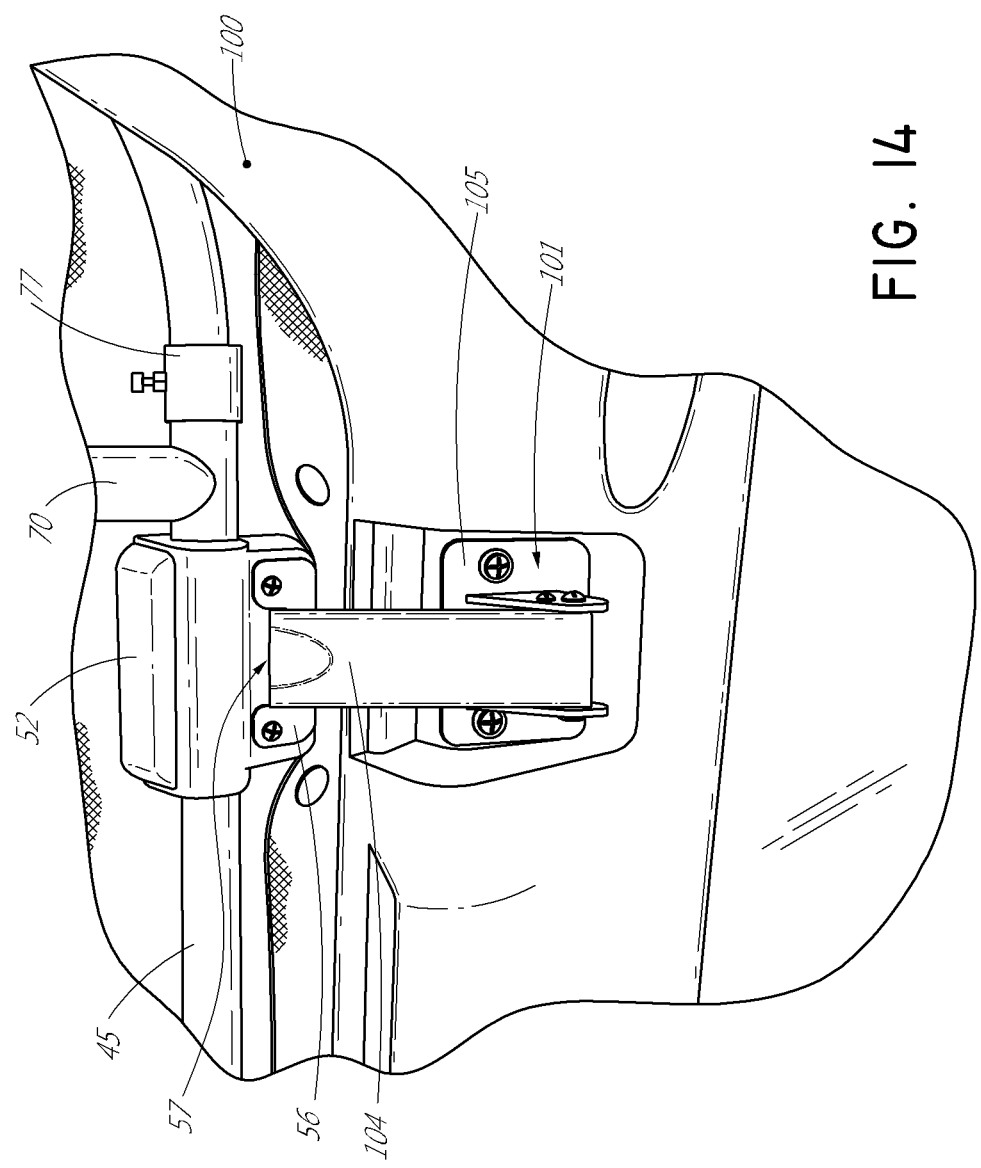
FIG. 14 shows an assembled view of the folding top assembly on the vehicle in the closed position with the folding top assembly latched to the vehicle.

Referring to FIG. 14, when the adjustable hook 103 is engaged in the recess 57, the locking bar 104 is pressed towards the engaging piece 102 to tighten the engagement between the engaging piece 102 and the latching bracket 56 as well as covering the engagement for a clean appearance. The folding top assembly 10 is now in the closed position and firmly secured to the vehicle 100. To retract the folding top assembly 10 into the open position, the locking bar 104 is pulled open to reveal and remove the engagement between the engaging piece 102 and the latching bracket 56. When the adjustable hook 103 is removed from the recess 57, the user can grab the first handle 96 and press the front portion 16A up and backwards, bringing the folding top assembly 10 into the open position. To bring the folding top assembly 10 back into the closed position, the user can reach back and grab the second handle 97 and bring the front portion 16A forward to the closed position, engage the adjustable hook 103 in the recess 57, and press the locking bar 104 towards the latching bracket 56, thereby securing the folding top assembly 10 to the vehicle 100. The folding top assembly 10 is not limited to latching to the vehicle 100 and can be assembled to the vehicle 100 by other securing and attaching means such as velcro, zippers, buttons, fasteners, or tiedowns.

Figure 15:
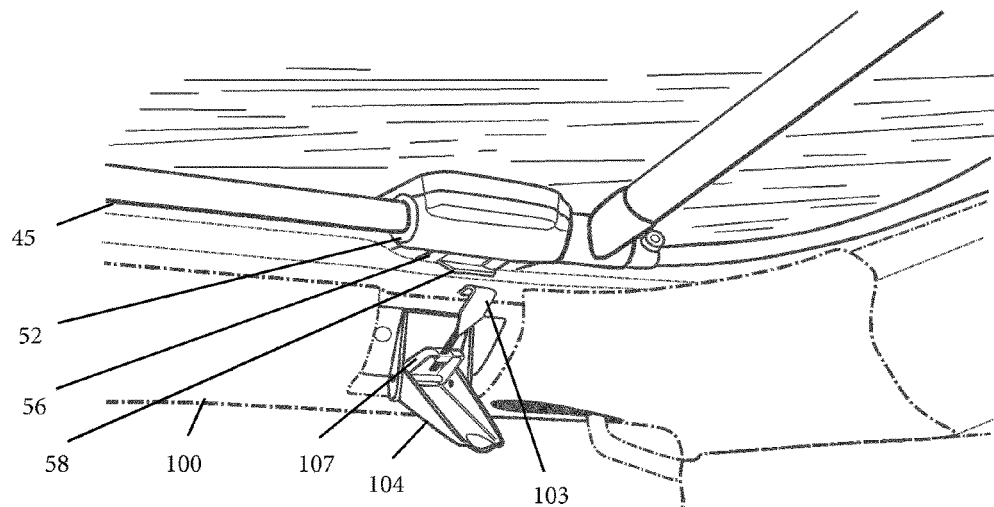
FIG. 15 is similar to FIG. 13 but shown with an embodiment of the latching bracket in an unlatched state.
Figure 16:
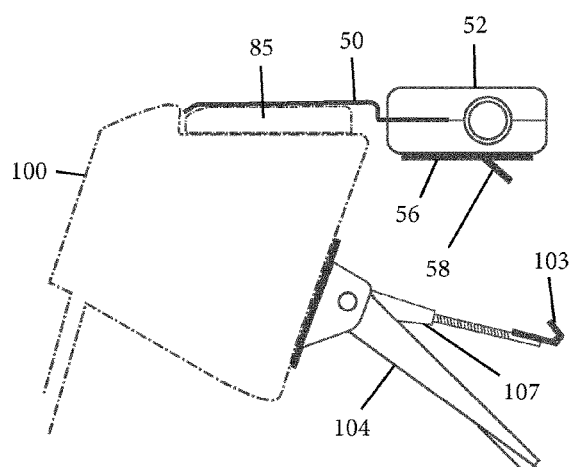
FIG. 16 shows a side view of the latching engagement of FIG. 15 in the unlatched state.

FIGS. 15 and 16 illustrates another embodiment of the latching bracket 56 attached or fastened to the attachment mount 52, which also engages with a latch 101 mounted on the vehicle 100 to lock the folding top assembly 10 in the closed position. The latching bracket 56 in this embodiment is similar to the embodiment above except that the latching bracket 56 has a catch 58 that extends outwardly instead of the recess 57 to engage with the adjustable hook 103 of the latch 101.

Figure 17:
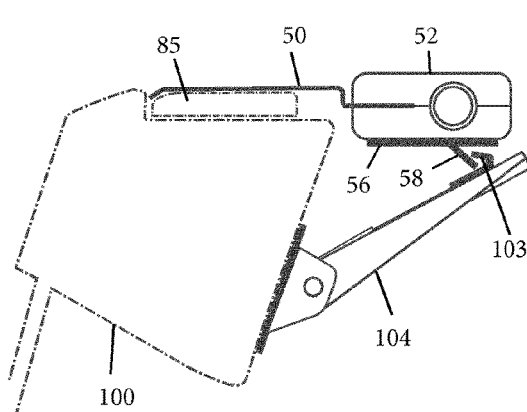
FIG. 17 shows a side view of the latching engagement of FIG. 15 but in a latched state.
Figure 18:
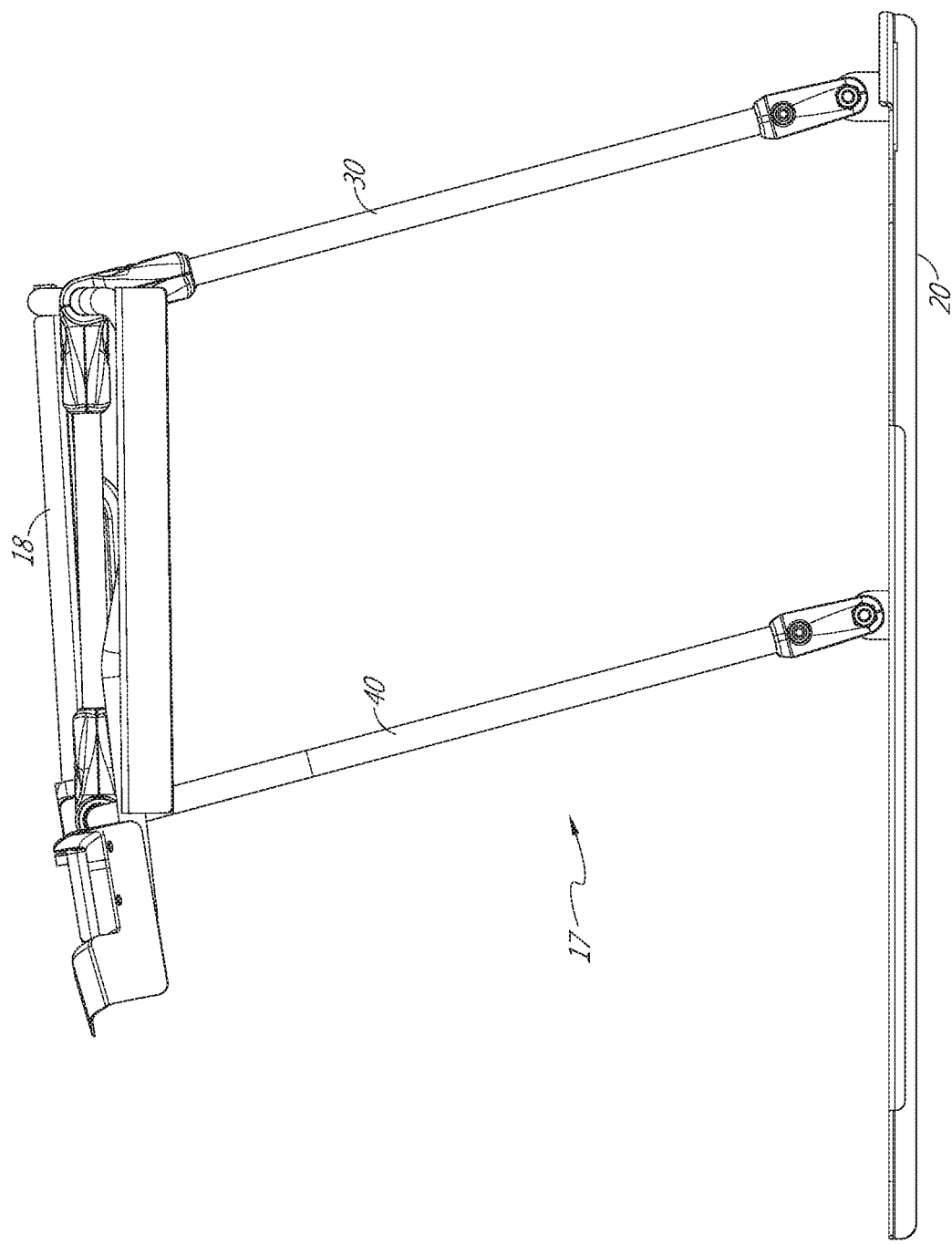
FIG. 18 shows a side view of an embodiment of a folding frame assembly in the intermediate position.
Figure 19:
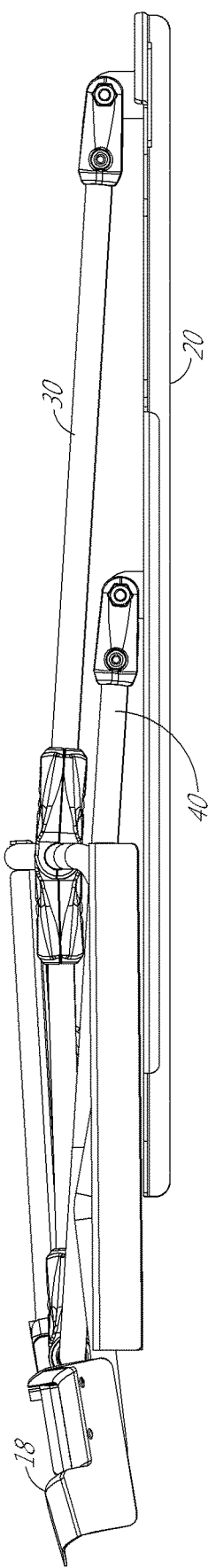
FIG. 19 shows a side view of the folding frame assembly in the closed position.

Referring to FIG. 17, when the adjustable hook 103 is engaged and held with the catch, the locking bar 104 is pressed towards the latching bracket 56 to tighten the engagement between the latching hook 103 and the latching bracket 56 as well as covering the engagement for a clean appearance.

A seal 85 can also be provided to form a snug fit between the folding top assembly 10 and the vehicle 100 and help minimize or prevent dust, dirt, moisture, or other contaminants from entering the vehicle 100 through the opening 12. For example, when the folding top assembly 10 is in the closed position, the user can pull on either the first or second handle 96, 97 thereby compressing the seal 85 and latching the folding top assembly 10 to the vehicle 100 via the latch 101 and the bracket 56. The seal 85 is provided in the interface between the folding top assembly 10 and the vehicle 100. The seal 85 can be fixed to the folding top assembly 10 or the vehicle 100, or a separate component sandwiched between the top assembly 10 and the vehicle 100.

FIGS. 18-24 illustrate an alternative embodiment of a folding frame assembly 17 for use with a vehicle 100 in the different positions discussed above. Embodiments of the folding frame assembly 17 can include any of the features discussed above or below, and should not be limited to the particular embodiments discussed. For example, features of one embodiment can be combined with features of another embodiment. The particular modifications shown in FIGS. 18-24 will now be discussed in detail, and features not discussed will be understood to be similar, or identical, to those discussed above. Some or all of the modifications discussed below can be incorporated into the above disclosure.

In some embodiments, the aft bar 60 can be formed of a single/unitary/integrally formed piece along the front and sides of the folding frame assembly 17, as compared to the multi piece structure discussed above, forming a general U-shape. Thus, the side sections 101 and the front section 109 of the aft bar 60 can be formed by a single piece of material. This can make the aft bar 60 similar in shape to the u-shaped front links 40. The single piece structure can help reduce motion of different pieces with respect to one another, thereby reducing or preventing strain between different pieces. Further, there is less likelihood of accidental motion upon the application of forces.

Figure 21A:
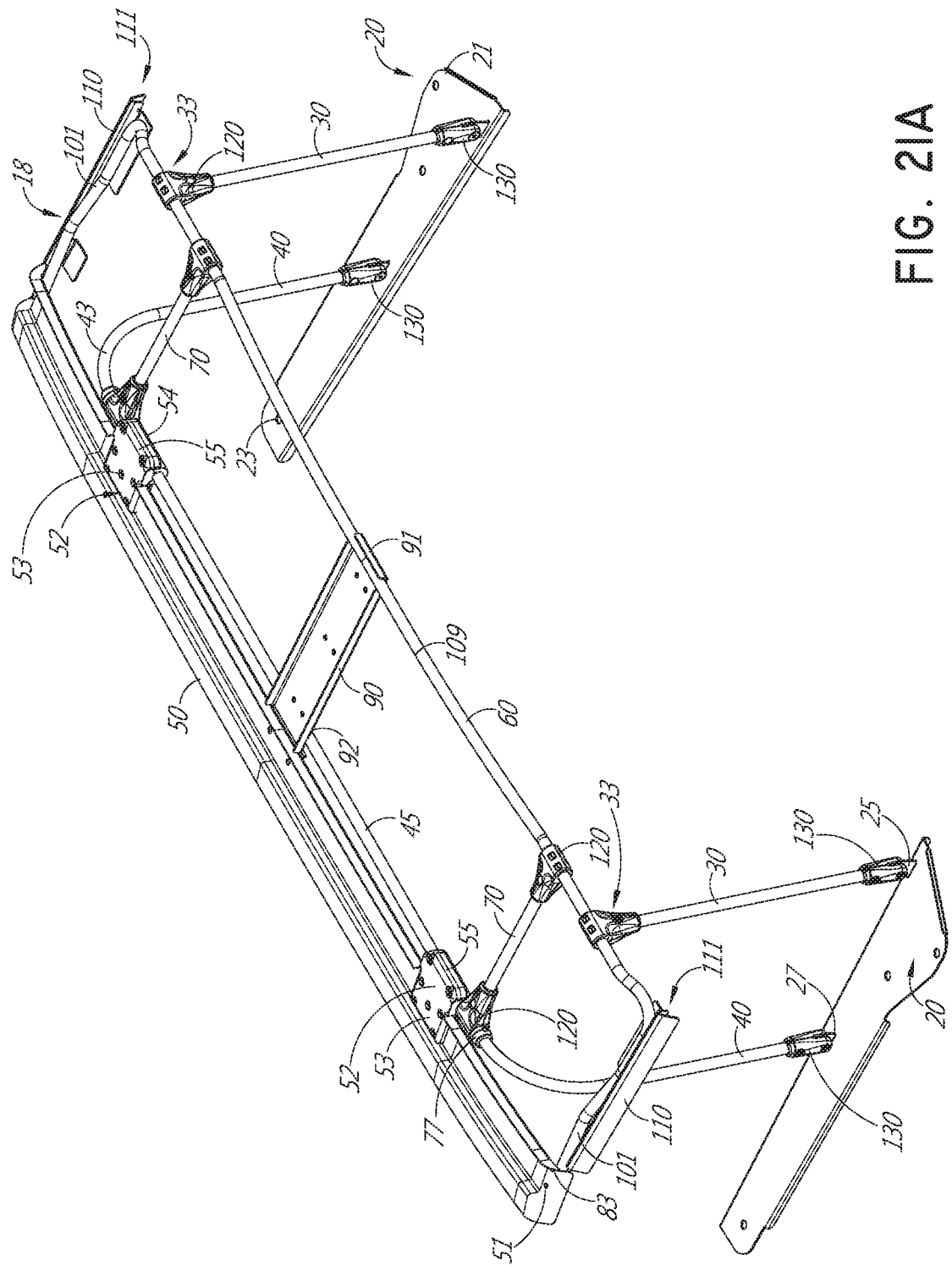
FIG. 21A shows a perspective view of an embodiment of the folding frame assembly in an intermediate position.

Further, as shown in FIG. 21A, in some embodiments the aft bar 60 can be bowed upwards on both the side sections 101 and the front section 109 so that the center of the sections 101/109 is higher than the respective end points. Thus, all portions of the aft bar 60 may not reside on the same plane. The bowing can be generally in the center, as shown in FIG. 21A, or can be in a different location, and the particular location of the bowing does not limit the disclosure. This bowing can advantageously allow for water (e.g., rain, snow) or solids (e.g., leafs, dust, dirt) to more easily, and in some cases automatically, roll off the sides of the folding frame assembly 17 when the soft cover 15 is attached. For example, by having the bowing in both directions, water will typically roll off the sides, thus preventing any water buildup which could damage the soft cover 15. Further, the bowing can prevent buildup of the water and/or solids on top of the roof, which could cause the soft cover 15 to bend inwards into the vehicle 100. In some embodiments bending may occur instead of bowing, and the particular dimensional changes do not limit the disclosure.

Figure 21B:
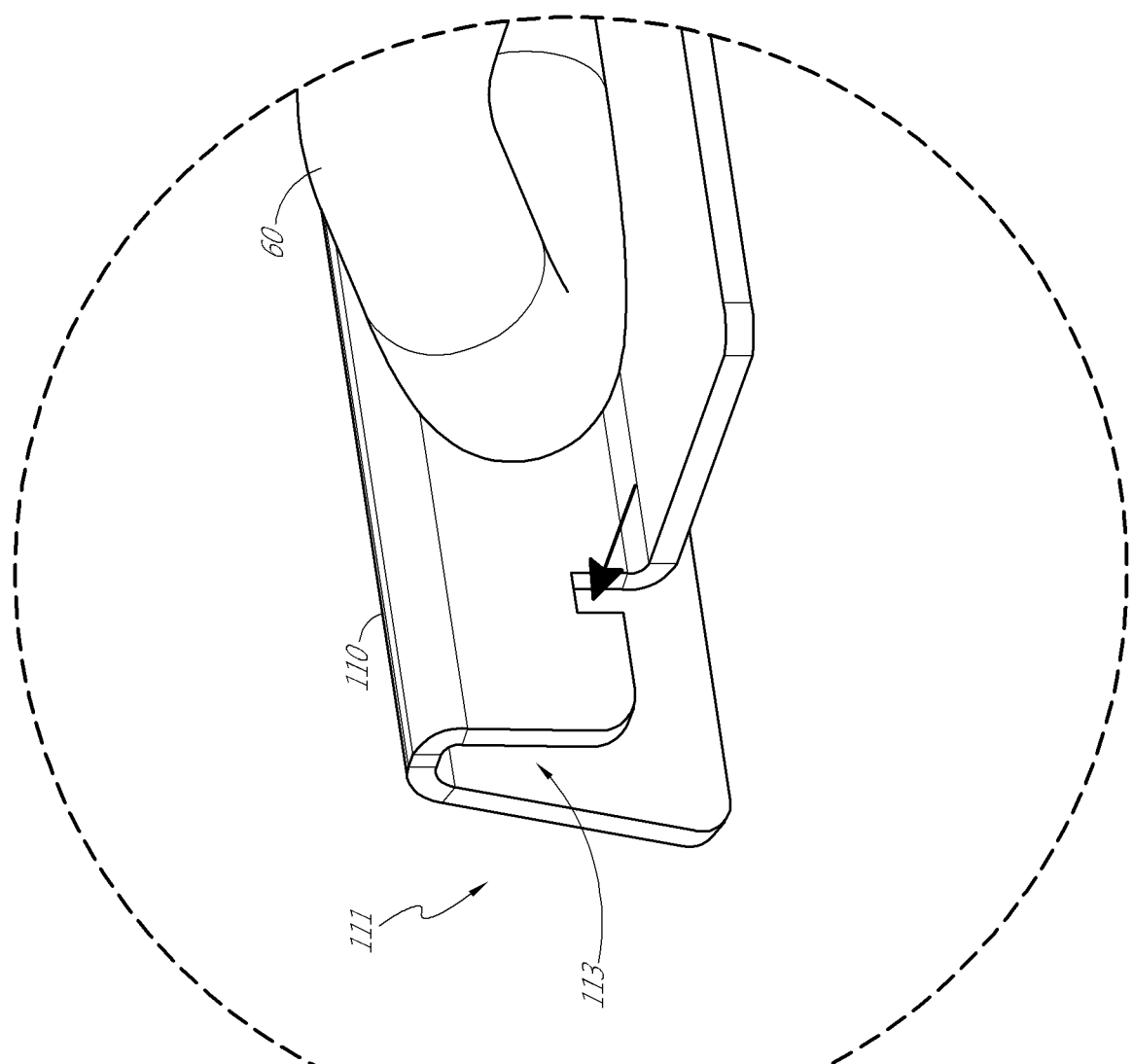
FIG. 21B shows an enlarged perspective view of an embodiment of the folding frame assembly in an intermediate position.
Figure 22:
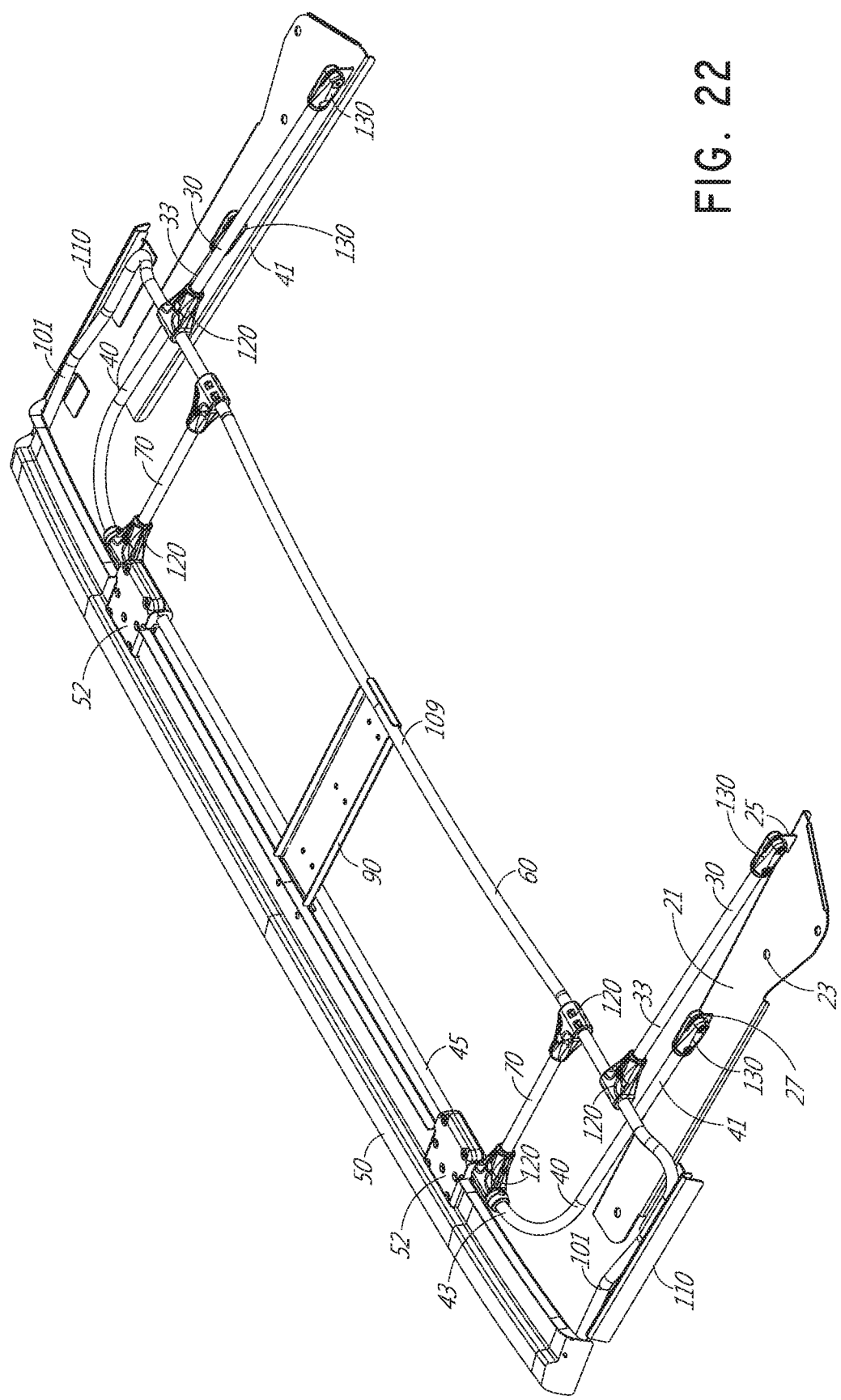
FIG. 22 shows a perspective view of an embodiment of the folding frame assembly in a closed position.
Figure 23:
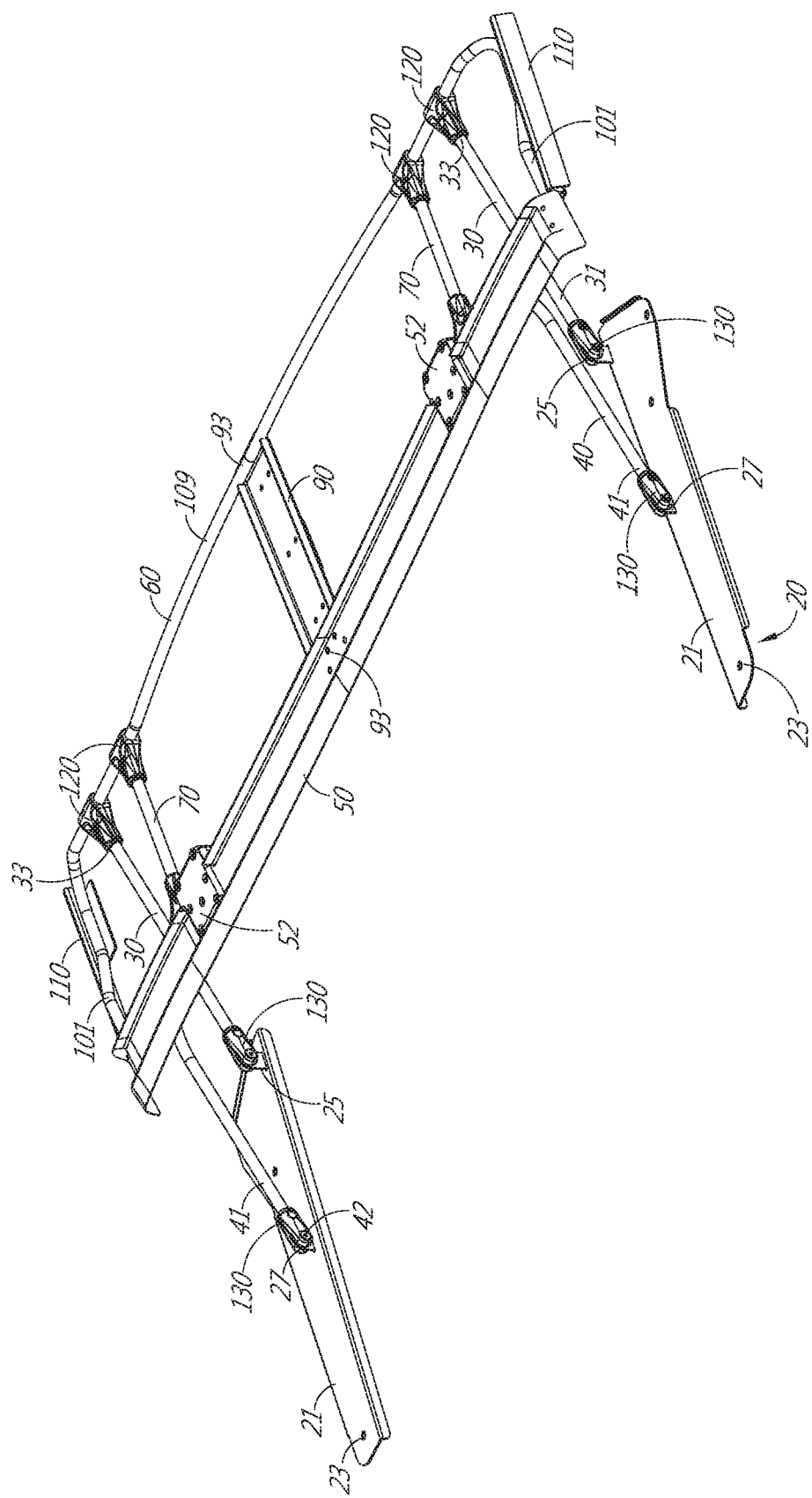
FIG. 23 shows a perspective view of an embodiment of the folding frame assembly in the open position.
Figure 24:
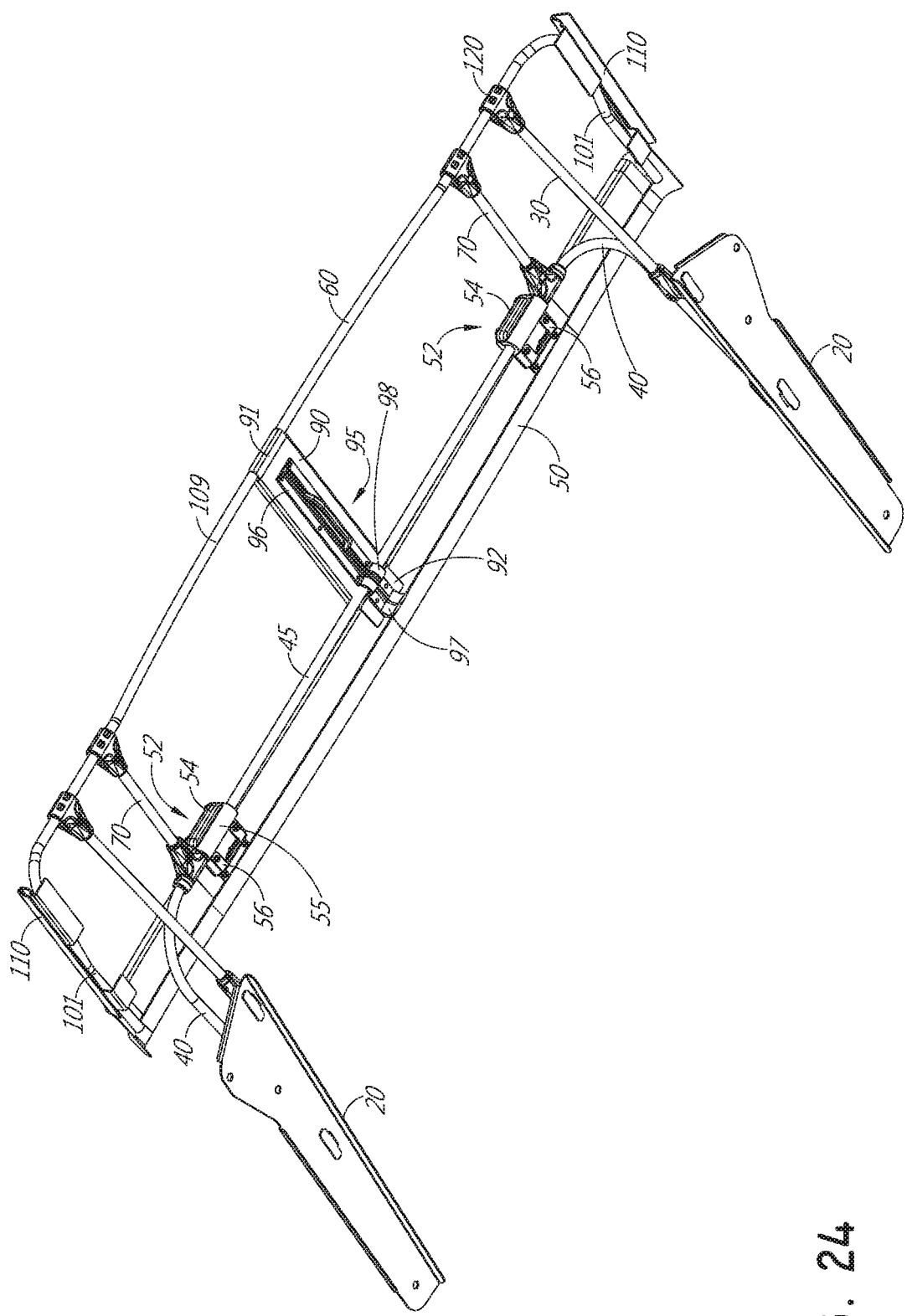
FIG. 24 shows a perspective view of the folding frame assembly in the open position but shown from a different aspect.

In some embodiments, an additional support piece 110 can be used on and/or in connection with the side sections 101 of aft bar 60, shown in the enlarged view of FIG. 21B of the first side 111 of the support piece 110. The support piece 110 and aft bar 60 can be connected through screws, latching, adhesives, and the particular methodology does not limit the disclosure. As shown, the support piece 110 can generally flat on its outer and upper surfaces. This can provide for a supporting mechanism for the soft cover 15, and can also give the soft cover 15 a particular shape along the support piece 110 that can provide pleasing aesthetics. Moreover, the support piece 110 can include a channel 113 on its inside surface. The channel 113 can extend the length of the support piece 110, or can extend partially down the length of the support piece 110 and the particular length does not limit the disclosure. As many soft covers include a tab or rod on its front end, the channel 113 can accept and retain such a tab or rod to hold the soft cover in place on the folding frame assembly. For example, the channel 113 can lock, snap, or otherwise contain the tab or rod, providing for further structural support to the soft cover 15 and preventing the soft cover from accidently coming off the folding frame assembly 17. In some embodiments, the channel 113 can include a snapping mechanism to attach to the soft cover 15. In some embodiments, the soft cover 15 can be tucked into the channel 113. Thus, the support piece 110 can provide for an easy connection between the soft cover 15 and the folding frame assembly. Further, the support piece 110 can advantageously provide a gap between a door of a vehicle 100 and the soft cover 15, preventing the soft cover 15 from catching during the opening or closing of the vehicle door.

In some embodiments, different collars 120 (also known as clamshell collars) can be used to hold and/or connect the different portions of the folding frame assembly 17 and can replace the collars 34 described above. Advantageously, collars 120 can prevent the aft bar 60, in particular front section 109, from rotation within the collars 120 which can cause damage or misalignment to the folding frame assembly 17. In some embodiments, the collars 120 can be formed of two generally opposite pieces that "clamp" onto the aft bar 60 (or other component). As the collar 120 halves are generally mirror images of one another, they can be formed to have an internal channel only slightly bigger than aft bar 60, thus gripping onto aft bar 60 upon closure.

In some embodiments, the attachment between the front links 40 and rear links 30 and frame supports 20 can be different from the embodiments discussed above. The attachment component can be shown clearly in FIG. 22. As shown, the links 40/30 can include an attachment component 130 which straddles the aft or forward tabs 25/27 coming up from the frame support 20. By straddling, the attachment components 130 provide for a more secure connection and allow for even pressure to be exerted onto the tabs 25/27 of the frame support 20, reducing or preventing any bending of the tabs 25/27. Additionally, the straddling of the aft/forward tabs 25/27 prevents unwanted rotation and/or torqueing of the front and rear links 40/30 on the frame supports 20.

Figure 20:
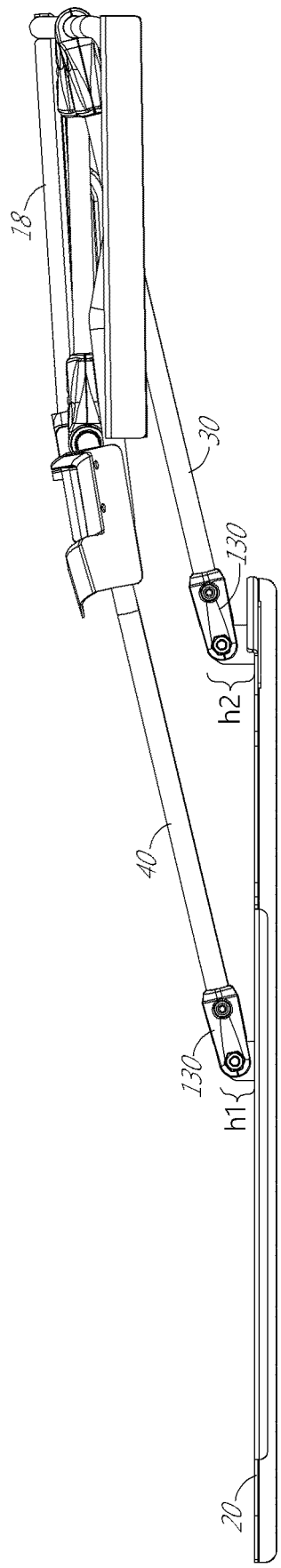
FIG. 20 shows a side view of the folding frame assembly in the open position.

In some embodiments, such as shown in FIG. 20, the front links 40 and rear links 30 can be attached to the frame support 20 at different distances from the base 21, so that there are different heights h1 for front links 40 and h2 for rear links 30. As shown in FIG. 20, h1 is smaller than h2, and the particular difference does not limit the disclosure. As the rear and front links 30/40 can have approximately the same length, this change in attachment height can cause the center link assembly 18 to be generally sloped downwards, e.g., towards the vehicle 100, when in the open position. Thus, the center link assembly 18 is not flat and parallel with the roof of the vehicle 100. This slope can provide a number of aerodynamic/wind advantages when the assembly 10 is in the open position. Thus, drag can be reduced when the assembly 10 is open, providing for improved gas mileage.

FIGS. 25-28 illustrate alternative embodiments of a folding frame assembly 17', 17" for use with a vehicle 100 in the different positions discussed above. Embodiments of the folding frame assembly 17', 17" can include any of the features discussed above or below, and should not be limited to the particular embodiments discussed. For example, features of one embodiment can be combined with features of another embodiment. The particular modifications shown in FIGS. 25-28 will now be discussed in detail, and features not discussed will be understood to be similar, or identical, to those discussed above. Some or all of the modifications discussed below can be incorporated into the above disclosure.

In some embodiments, the folding frame assembly 17 can optionally include a front support beam 190. The front support beam 190 can be disposed between a windshield of the vehicle 100 and the front attachment bar 50'. The front support beam 190 can be configured to engage the front attachment bar 50' and the vehicle 100. The front attachment bar 50' can be configured to engage and latch to the front support beam 190 at the closed position. The top surface of the front support beam 190 can be flush with the top surface of the frame supports 20'. In some embodiments, the front support beam 190 can extend above and/or below the frame supports 20'.

Figure 26:
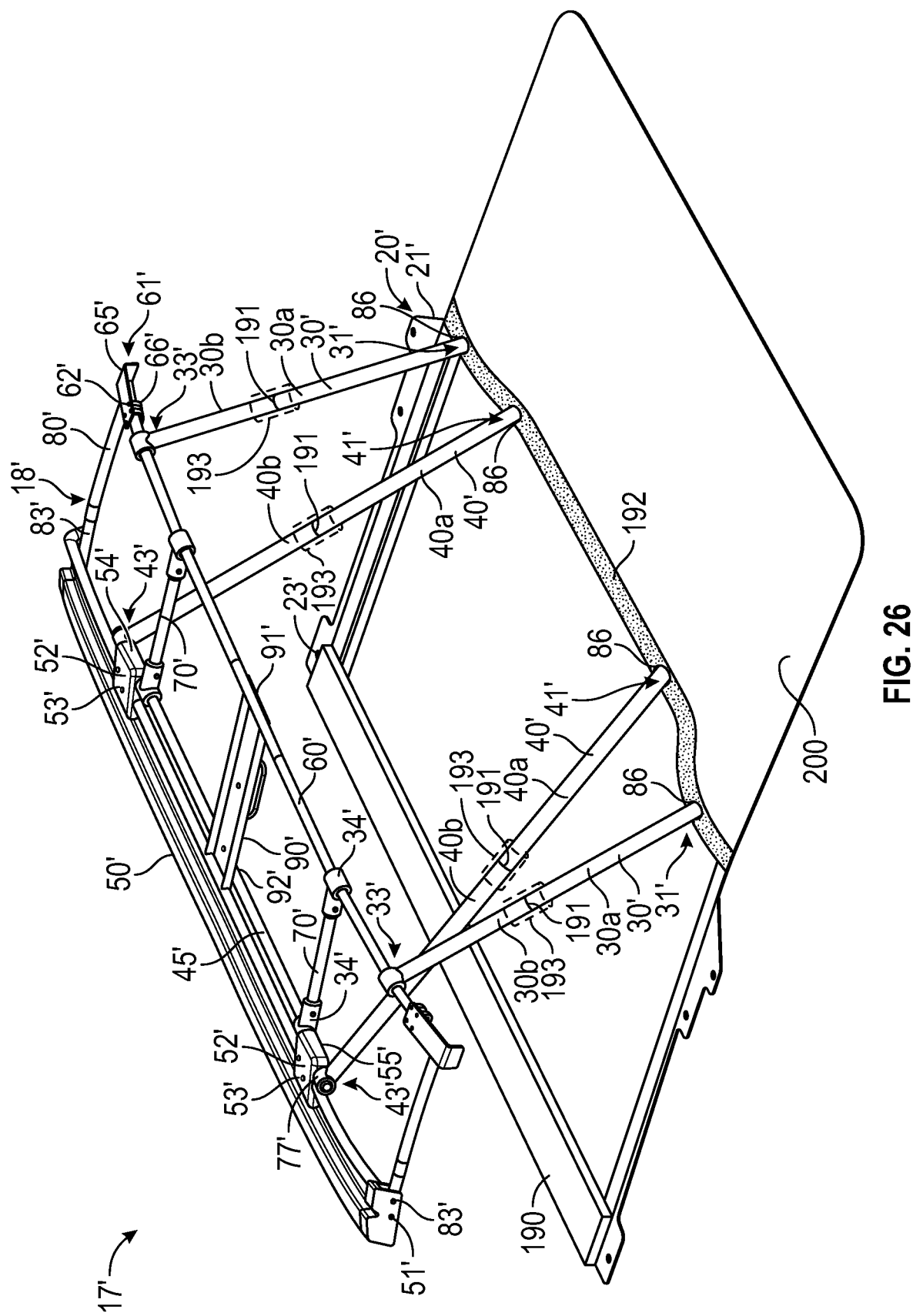

In some embodiments, the folding frame assembly 17 can have at least one link 30', 40'. In some embodiments, the folding frame assembly 17 can include a first link 30' having a first end 31' and a second end 33', and a second link 40' having a first end 41' and a second end 43'. The first link 30' can include a pair of rotatable arms. The second link 40' can include a pair of rotatable arms. At least one of the first and second links 30', 40' can be adjustable in length. For example, as in the illustrated embodiment, the first and/or second link 30', 40' can include extendable arms, such as telescoping arms including proximal segment 30a, 40a and distal segment 30b, 40b. In some embodiments including the illustrated embodiment, the proximal segment 30a, 40a surrounds the distal segment 30b, 40b. In some embodiments, at least one of the first and second links 30', 40' can be foldable and/or collapsible such that when the folding frame assembly 17 is in the closed position, the cover can fold rearward. For example, in some embodiments, as illustrated in FIG. 26, the first and second links 30', 40' can include a hinge 191 and a collar 193 surrounding the hinge 191, where the collar 193 can slide over the hinge 191 to lock it in place and/or can slide away from the hinge 191 along the links 30', 40' to unlock the hinge 191 and allow the links 30', 40' to collapse.

In some embodiments, the folding frame assembly 17 can be compatible with and configured to couple to a partial vehicle top 200, such as a hard top already assembled on the vehicle 100. For example, the folding frame assembly 17 can include a rear support beam 192. The rear support beam 192 can be shaped such that it engages and creates a sealing interface with the partial vehicle top 200. In some embodiments, the rear support beam 192 is curved. In some embodiments, when the folding frame assembly 17 is in the closed position, the folded cover rests above at least a portion of the rear support beam 192 and/or the partial vehicle top 200. In some embodiments, the cover can fold on top of itself. In some embodiments, the cover is rigid.

Figure 25:
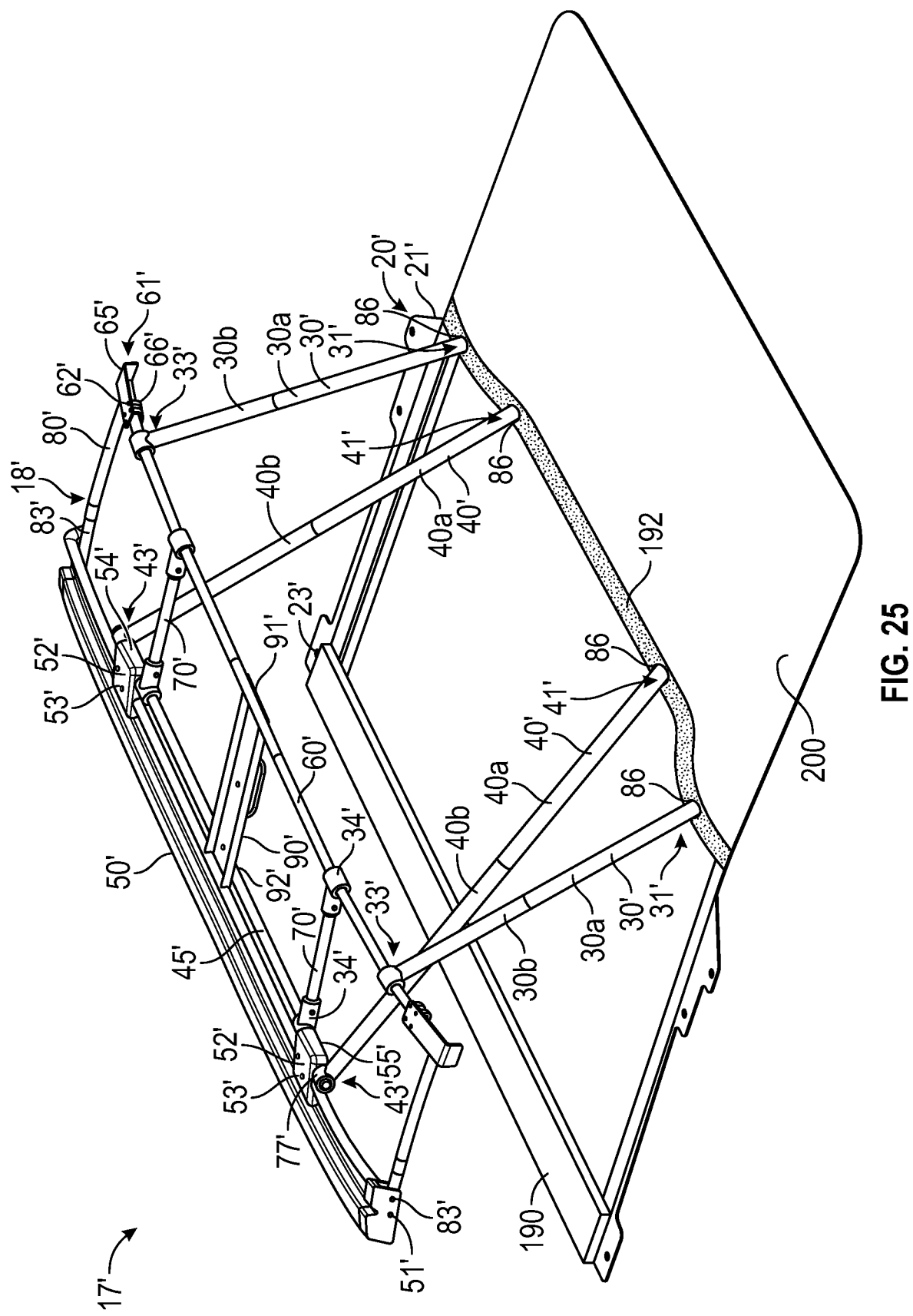
FIGS. 25-28 show perspective views of embodiments of the folding frame assembly engaging a partial vehicle top.

As illustrated in FIG. 25, the rotatable arms of the first and/or second links 30', 40' can be mounted to the rear support beam 192 using mounts 86 including tabs, apertures, hinges, and/or flanges, etc. The links 30', 40' (and mounts 86) can be mounted on portions of the rear support beam 192 that are spaced apart from the frame supports 20'. This spacing can improve the seal between the lateral sides of the folding frame assembly 17 and the vehicle 100 by reducing the amount of components positioned along the lateral sides of the vehicle 100.

Figure 27:
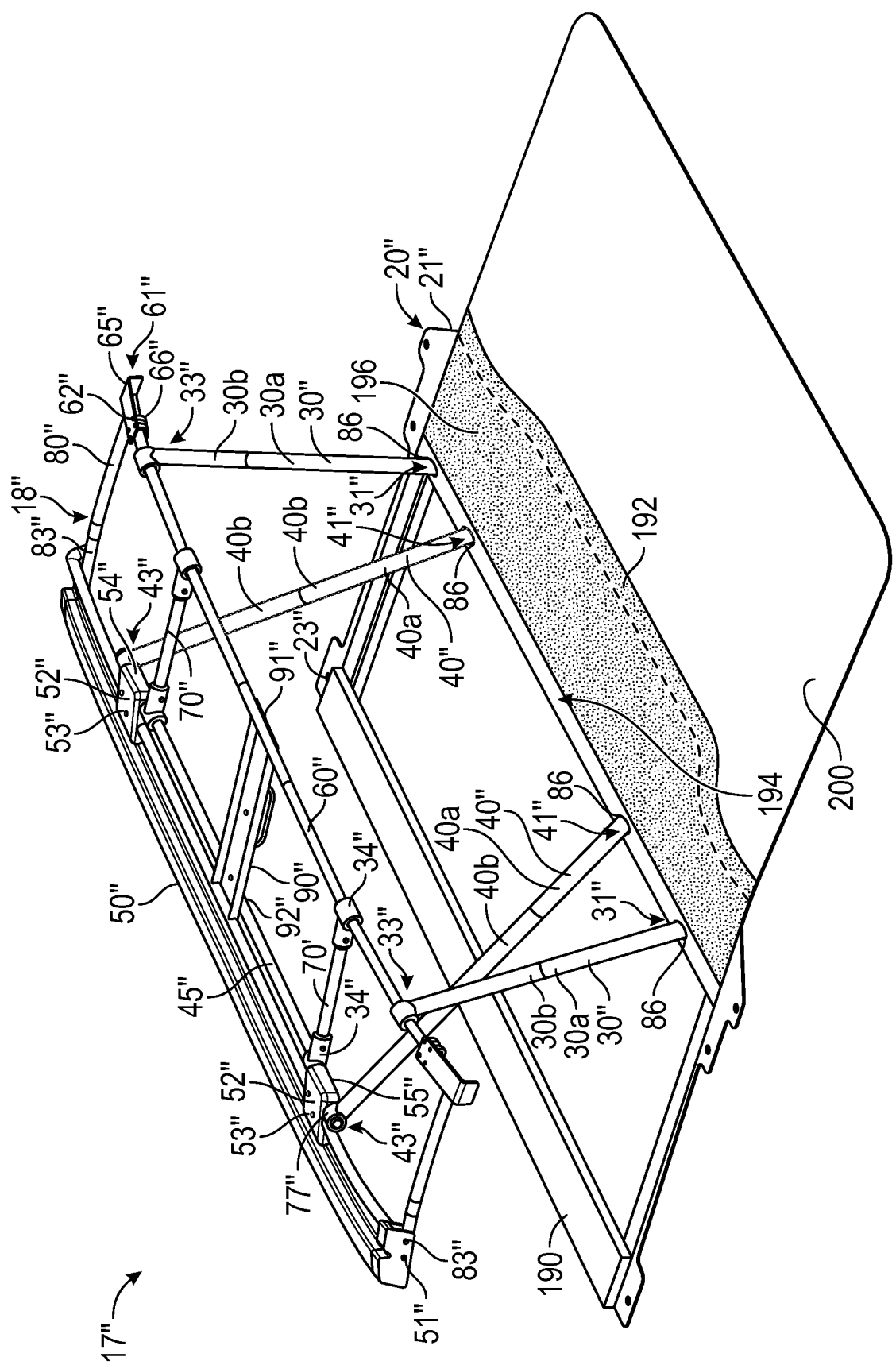

As illustrated in FIG. 27, the rotatable arms of the first and/or second links 30', 40' can be mounted (e.g., using mounts 86) to a portion of the folding frame assembly 17 spaced apart from the rear support beam 192. For example, in some embodiments, the folding frame assembly 17 can include a cross beam 194 spaced apart from and forward of the rear support beam 192. The links 30", 40" can be coupled to a plurality of mounts 86 disposed along the cross beam 194. The mounts 86 can be disposed along the cross beam 194 at positions that are spaced apart from the frame supports 20". In some embodiments, the folding frame assembly 17 can include a rear panel segment 196 that remains in a fixed position on the vehicle 100 when the folding top assembly is assembled on the vehicle 100 (e.g., the rear panel segment 196 remains flat when the folding frame assembly 17 is in both the open and closed positions). The rear panel segment 196 can extend between the rear support beam 192 and the cross beam 194. In some embodiments, as illustrated in FIG. 27, the rear panel segment 196 can extend above, or cover, at least a portion of the top surface of the rear support beam 192 (one possible location of the rear support beam 192 beneath the rear panel segment 196 is outlined in dashed lines). The rear panel segment 196 can be made of a soft material, a hard material, or a combination of soft and hard materials.

In some embodiments, the links 30, 40 can be mounted directly to the partial vehicle top 200, for example using clips as mounts 86.

Figure 28:
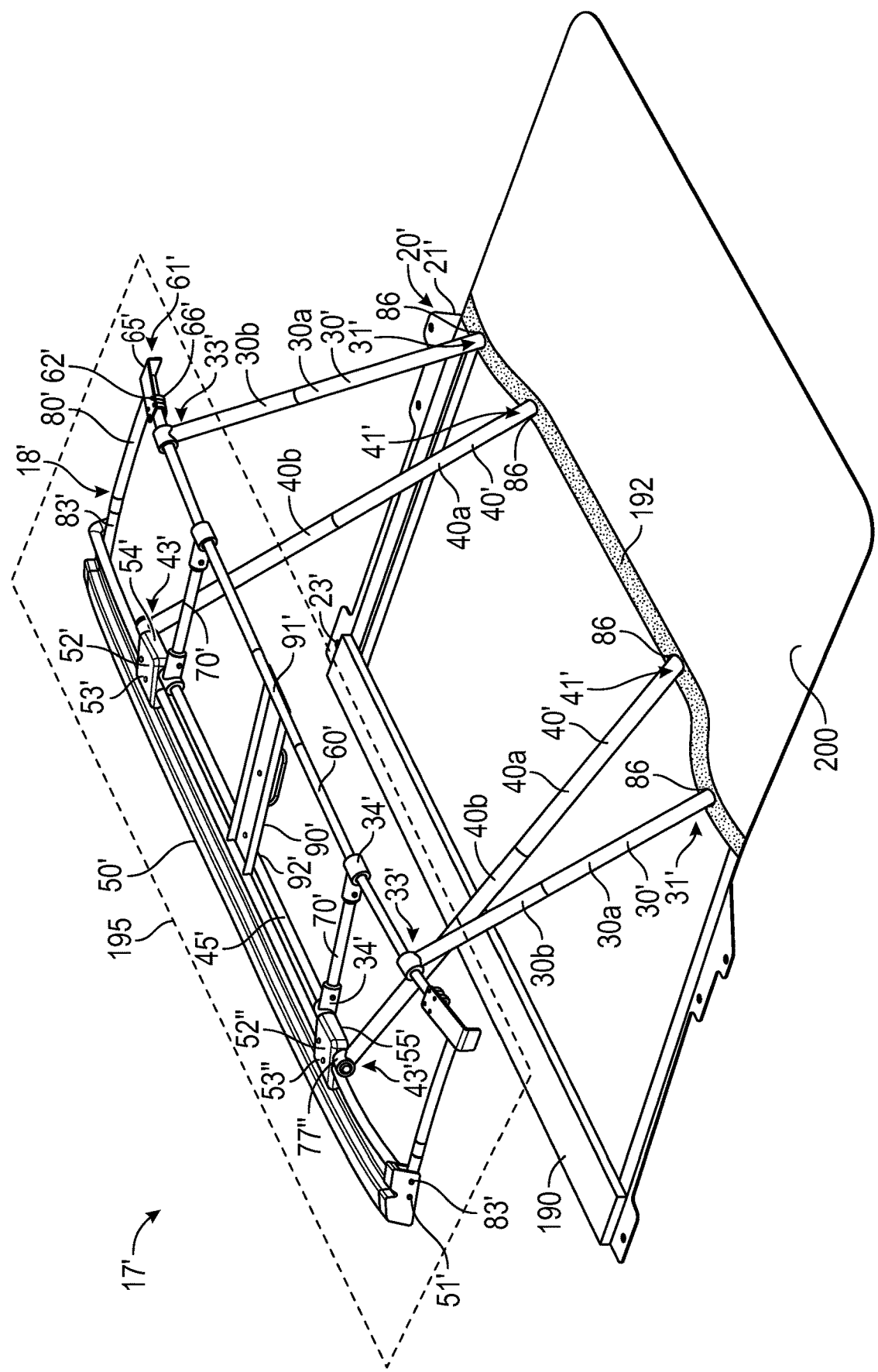

In some embodiments, the folding frame assembly 17' can include a pivoting hard top. As illustrated in FIG. 28, in some embodiments, a panel 195, such as a resilient non-folding panel, can be coupled to the folding frame assembly 17'. In some embodiments, the panel 195 is a hard or rigid top. The panel 195 can connect to the partial vehicle top 200. In some embodiments including the illustrated embodiment, the panel 195 connects to a fixed hard top, such as a resilient non-folding panel. In some embodiments, the panel 195 connects directly to the partial vehicle top 200. In some embodiments, the rear support beam 192 couples the panel 195 to the partial vehicle top 200. The panel 195 can be curved to conform to the shape of the partial vehicle top 200.

From the foregoing description, it will be appreciated that inventive folding vehicle tops and related methods are disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations and/or "some embodiments" can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount.

Some embodiments have been described in connection with the accompanying drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

What is claimed is:

1. A folding top assembly for covering an opening of a vehicle, the folding top assembly comprising a folding frame assembly and a cover attached to the folding frame assembly and the vehicle, the folding frame assembly comprising:
    a first and second frame support;
    a rear support beam;
    a first link and a second link rotatably coupled to the rear support beam;
    a cover support extending from adjacent a first side of the cover to adjacent a second side of the cover and rotatably coupled to both the first link and the second link, the cover support is movable between a closed position and an open position;
    wherein the first link comprises a pair of rotatable arms and the second link comprises a pair of rotatable arms;
    wherein at least one of the first link and the second link are adjustable in length;
    wherein in the open position, the opening is exposed and the cover folds rearward; and
    wherein in the closed position, the opening is covered.

2. The folding top assembly of claim 1, wherein the arms comprise a proximal segment and a distal segment, and the proximal segment surrounds the distal segment.

3. The folding top assembly of claim 1, wherein the first and second links are spaced apart from the first and second frame supports.

4. The folding top assembly of claim 1, wherein the first and second links comprise a hinge and a collar, the collar being slidably engaged to the links.

5. The folding top assembly of claim 1, further comprising a front support beam, wherein the cover support comprises a front attachment bar configured to couple to the front support beam.

6. The folding top assembly of claim 1, further comprising a cross beam spaced apart from and forward of the rear support beam.

7. The folding top assembly of claim 1, wherein the cover is a non-folding panel.

8. A folding top assembly for covering an opening of a vehicle, the folding top assembly comprising a folding frame assembly and a cover attached to the folding frame assembly and the vehicle, the folding frame assembly comprising:
- a frame support;
- a rear support beam;
- at least one link rotatably coupled to the rear support beam;
- a cover support extending from adjacent a first side of the cover to adjacent a second side of the cover and rotatably coupled to the at least one link, the cover support is movable between a closed position and an open position;
- wherein the cover is a non-folding panel;
- wherein in the open position, the opening is exposed and the cover folds rearward; and
- wherein in the closed position, the opening is covered.

9. A folding top assembly for covering an opening of a vehicle, the folding top assembly comprising a folding frame assembly and a cover attached to the folding frame assembly and the vehicle, the folding frame assembly comprising:
- a first and second frame support;
- a rear support beam;
- a cross beam extending between the first frame support and the second frame support, wherein the cross beam is spaced apart from and forward of the rear support beam and spaced apart from and rearward of a front edge of the opening of the vehicle;
- at least one link rotatably coupled to the cross beam;
- a cover support extending from adjacent a first side of the cover to adjacent a second side of the cover and rotatably coupled to the at least one link, the cover support is movable between a closed position and an open position;
- wherein in the open position, the opening is exposed and the cover folds rearward; and
- wherein in the closed position, the opening is covered.

10. The folding top assembly of claim 8, wherein the at least one link comprises a pair of rotatable arms.

11. The folding top assembly of claim 10, wherein at least one of the at least one link is adjustable in length.

12. The folding top assembly of claim 10, wherein the arms comprise a proximal segment and a distal segment, and the proximal segment surrounds the distal segment.

13. The folding top assembly of claim 8, further comprising a front support beam, wherein the cover support comprises a front attachment bar configured to couple to the front support beam.

14. The folding top assembly of claim 8, further comprising a cross beam spaced apart from and forward of the rear support beam.

15. The folding top assembly of claim 9, wherein the cover is a non-folding panel.

16. The folding top assembly of claim 9, further comprising a front support beam, wherein the cover support comprises a front attachment bar configured to couple to the front support beam.

* * * * *